US012767182B2

(12) United States Patent
Fujimoto

(10) Patent No.: US 12,767,182 B2
(45) Date of Patent: Oct. 20, 2026

(54) AUTONOMOUS TRAVEL DEVICE, AUTONOMOUS TRAVEL CONTROL SYSTEM, AUTONOMOUS TRAVEL CONTROL DEVICE, AUTONOMOUS TRAVEL CONTROL METHOD, AND AUTONOMOUS TRAVEL CONTROL PROGRAM

(71) Applicant: DENSO CORPORATION, Kariya-city (JP)

(72) Inventor: Keigo Fujimoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 43 days.

(21) Appl. No.: 18/907,281

(22) Filed: Oct. 4, 2024

(65) Prior Publication Data

US 2025/0026377 A1 Jan. 23, 2025

Related U.S. Application Data

(63) Continuation of application No. PCT/JP2023/011249, filed on Mar. 22, 2023.

(30) Foreign Application Priority Data

Apr. 8, 2022 (JP) ................................ 2022-064604

(51) Int. Cl.
*B60W 60/00* (2020.01)
*B60R 25/23* (2013.01)
*B60R 25/30* (2013.01)

(52) U.S. Cl.
CPC ....... *B60W 60/00256* (2020.02); *B60R 25/23* (2013.01); *B60R 25/30* (2013.01)

(58) Field of Classification Search
CPC .. B60W 60/00256; B60R 25/23; B60R 25/30; B60P 1/64; B62D 53/00; B65G 61/00; G05D 1/02
See application file for complete search history.

(56) References Cited

U.S. PATENT DOCUMENTS 11,772,717 B1 * 10/2023 Ebrahimi Afrouzi ........................ G05D 1/0287 701/23
2019/0244460 A1 * 8/2019 Kaneko .............. G06Q 10/0833
2021/0080953 A1 * 3/2021 Kuo ...................... B60L 3/0015
(Continued)

OTHER PUBLICATIONS

Demonstration Experiment of Mitsubishi Electric's "Multi-purposeTransport Robot System" and Panasonic's "Follow-type Mobility" at Fujita Health University Hospital—Aichi Robot Showcase, URL: https://robotstart.info/2021/03/23/aichi-robotshowcase-06.html, Date of Posting: Mar. 23, 2021, Searched on: Mar. 28, 2022, 12 pages.

*Primary Examiner* — Anne Marie Antonucci
*Assistant Examiner* — Patrick Daniel Mohl
(74) *Attorney, Agent, or Firm* — Precision Patents, P.C.

(57) ABSTRACT

An autonomous travel device, an autonomous travel control system, an autonomous travel control device, an autonomous travel control method, or a non-transitory computer-readable storage medium storing an autonomous travel control program switches a state of a door of a housing unit coupled to the travel unit to an unlocked state, and releases the coupling of the travel unit and the housing unit in the unlocked state of the door.

18 Claims, 21 Drawing Sheets

(56) References Cited

U.S. PATENT DOCUMENTS

| | | | | |
|---|---|---|---|---|
| 2021/0150655 | A1* | 5/2021 | Matsutani | B60P 1/6481 |
| 2021/0158280 | A1* | 5/2021 | Matsutani | G06Q 10/0832 |
| 2021/0256472 | A1* | 8/2021 | Javidan | H04W 4/025 |
| 2021/0272048 | A1 | 9/2021 | Tazume | |
| 2021/0300435 | A1 | 9/2021 | Kondo et al. | |
| 2021/0302961 | A1 | 9/2021 | Iwaki et al. | |
| 2021/0304127 | A1 | 9/2021 | Yamamoto et al. | |
| 2021/0370869 | A1 | 12/2021 | Tazume | |
| 2022/0084340 | A1* | 3/2022 | Hall | B60P 1/003 |
| 2022/0092886 | A1* | 3/2022 | Hart | G08B 25/10 |
| 2023/0001956 | A1* | 1/2023 | Langenfeld | B60P 1/6436 |
| 2023/0192143 | A1* | 6/2023 | Zuckerman | G06Q 10/08 |
| 2026/0001720 | A1* | 1/2026 | Kalouche | B65G 1/1376 |

* cited by examiner

AUTONOMOUS TRAVEL DEVICE, AUTONOMOUS TRAVEL CONTROL SYSTEM, AUTONOMOUS TRAVEL CONTROL DEVICE, AUTONOMOUS TRAVEL CONTROL METHOD, AND AUTONOMOUS TRAVEL CONTROL PROGRAM

CROSS REFERENCE TO RELATED APPLICATIONS

The present application is a continuation application of International Patent Application No. PCT/JP2023/011249 filed on Mar. 22, 2023, which designated the U.S. and claims the benefit of priority from Japanese Patent Application No. 2022-064604 filed on Apr. 8, 2022. The entire disclosures of all of the above applications are incorporated herein by reference.

TECHNICAL FIELD

The present disclosure relates to autonomous travel control technology for controlling an autonomous travel device.

BACKGROUND

As a comparative example, an unmanned mobile delivery vehicle has been known. When a user is authenticated, this delivery vehicle unlocks the door, permitting the user to receive a package.

Further, as another example, a robot system including a cart capable of housing luggage and an autonomous travel robot that can be attached to and detached from the cart has been known.

SUMMARY

An autonomous travel device, an autonomous travel control system, an autonomous travel control device, an autonomous travel control method, or a non-transitory computer-readable storage medium storing an autonomous travel control program switches a state of a door of a housing unit coupled to the travel unit to an unlocked state, and releases the coupling of the travel unit and the housing unit in the unlocked state of the door.

DETAILED DESCRIPTION

Figure 1:
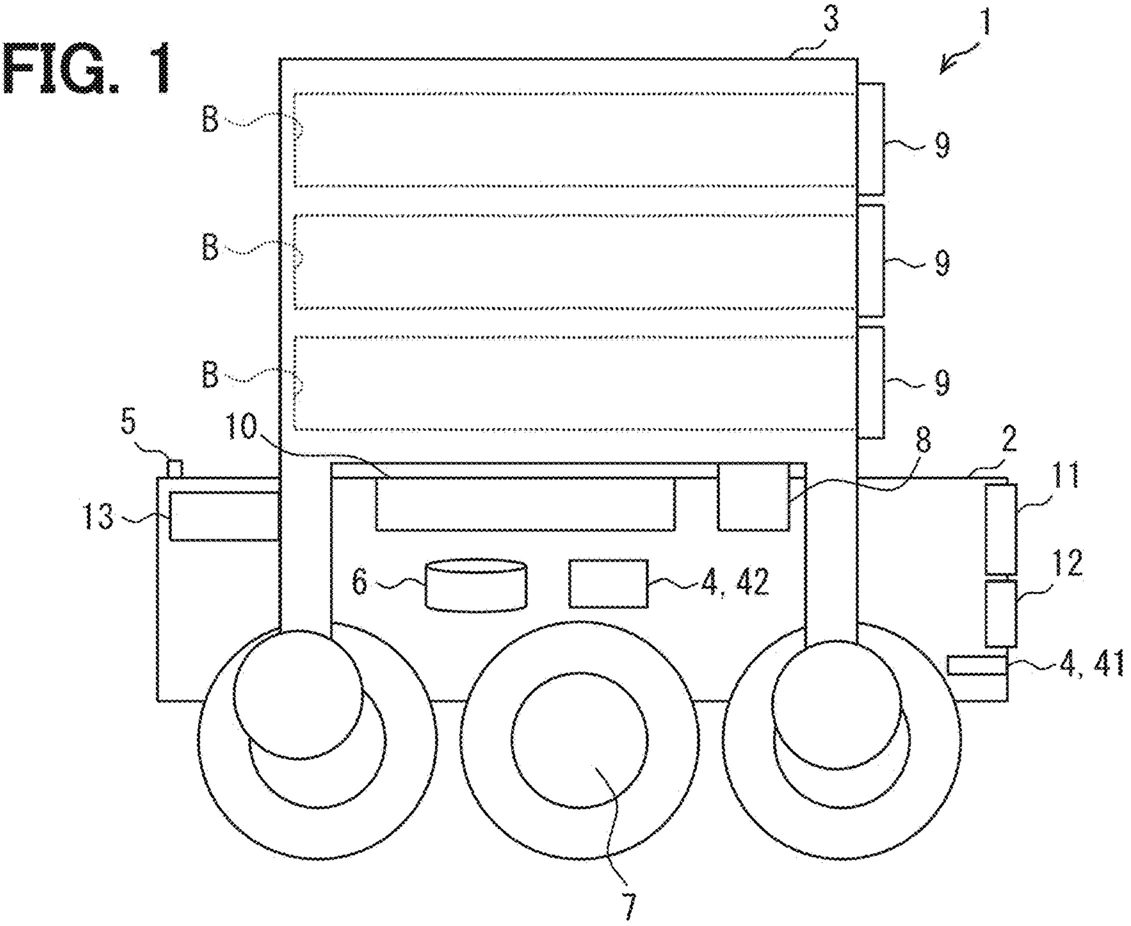
FIG. 1 is a view showing an overall configuration of a first embodiment.

Based on the comparative example, it is not known how to control separation and coupling of units and locking and unlocking of doors in an autonomous travel device where a housing unit and a travel unit can be separated. Specifically, based on the comparative example, control of the autonomous travel device that ensures security in the delivery of the transport target and ensures housing flexibility in the housing of the transport target is not known.

One example of the present disclosure provides an autonomous travel device capable of ensuring security in delivery of a transport target and permits the flexibility in housing of the transport target. Another example of the present disclosure provides an autonomous travel control system capable of ensuring security in delivery of a transport target and permits the flexibility in housing of the transport target. Further, another example of the present disclosure provides an autonomous travel control device capable of ensuring security in delivery of a transport target and permits the flexibility in housing of the transport target. Further, another example of the present disclosure provides an autonomous travel control method capable of ensuring security in delivery of a transport target and permits the flexibility in housing of the transport target. Further, another example of the present disclosure provides a non-transitory computer-readable storage medium storing an autonomous travel control program capable of ensuring security in delivery of a transport target and permit the flexibility in housing of the transport target.

According to a first example embodiment, an autonomous travel device includes: a housing unit including a housing room capable of housing a transport target; and a travel unit that includes a controller including a processor and is detachably coupled to the housing unit. The housing unit includes a door that opens and closes the housing room, mechanically switches a state between a locked state and an unlocked state according to an electrical control from the controller, and mechanically maintains a state prior to decoupling in a coupling release state of the travel unit and the housing unit. The controller of the travel unit switches the state of the door of the housing unit coupled to the travel unit to the unlocked state when a delivery condition for delivering the transport target to a transport destination user is satisfied, switches the state of the door of the housing unit coupled to the travel unit to the unlocked state when a release condition for releasing coupling to the travel unit is satisfied, and releases the coupling of the travel unit and the housing unit in the unlocked state of the door when the release condition is satisfied.

According to a second example embodiment, an autonomous travel control system includes a processor configured to control an autonomous travel device including a housing unit including a housing room capable of housing a transport target and a travel unit that is detachably coupled to the housing unit. The housing unit includes a door that opens and closes the housing room, mechanically switches a state between a locked state and an unlocked state according to an electrical control when a delivery condition for delivering the transport target to a transport destination user is satisfied. The processor is configured to: switch a state of a door of the housing unit coupled to the travel unit to an unlocked state, the door mechanically maintaining a state prior to decoupling in a state where the travel unit and the housing unit are decoupled; switch the state of the door of the housing unit coupled to the travel unit to the unlocked state when a release condition for releasing coupling to the housing unit is satisfied; and release the coupling of the travel unit and the housing unit in the unlocked state of the door when the release condition is satisfied.

According to a third example embodiment, an autonomous travel control device includes a processor that: is configured to control an autonomous travel device including a housing unit including a housing room capable of housing a transport target and a travel unit that is detachably coupled to the housing unit; and is mountable on the autonomous travel device. The housing unit coupled to the travel unit includes a door that opens and closes the housing room, mechanically switches a state between a locked state and an unlocked state according to an electrical control when a delivery condition for delivering the transport target to a transport destination user is satisfied. The processor is configured to: switch a state of a door of the housing unit coupled to the travel unit to an unlocked state, the door mechanically maintaining a state prior to decoupling in a state where the travel unit and the housing unit are decoupled; switch the state of the door of the housing unit coupled to the travel unit to the unlocked state when a release condition for releasing coupling to the housing unit is satisfied; and release the coupling of the travel unit and the housing unit in the unlocked state of the door when the release condition is satisfied.

According to a fourth example embodiment, an autonomous travel control method is executed by a processor for controlling an autonomous travel device including a housing unit including a housing room capable of housing a transport target and a travel unit that is detachably coupled to the housing unit. The housing unit includes a door that opens and closes the housing room, mechanically switches a state between a locked state and an unlocked state according to an electrical control when a delivery condition for delivering the transport target to a transport destination user is satisfied. The method includes: switching a state of a door of the housing unit coupled to the travel unit to an unlocked state, the door mechanically maintaining a state prior to decoupling in a state where the travel unit and the housing unit are decoupled; switching the state of the door of the housing unit coupled to the travel unit to the unlocked state when a release condition for releasing coupling to the housing unit is satisfied; and releasing the coupling of the travel unit and the housing unit in the unlocked state of the door when the release condition is satisfied.

According to a fifth example embodiment, a non-transitory computer-readable storage medium stores an autonomous travel control program including instructions executed by a processor for controlling an autonomous travel device including a housing unit including a housing room capable of housing a transport target and a travel unit that is detachably coupled to the housing unit. The housing unit includes a door that opens and closes the housing room, mechanically switches a state between a locked state and an unlocked state according to an electrical control when a delivery condition for delivering the transport target to a transport destination user is satisfied. The instructions include causing the processor to: switch a state of a door of the housing unit coupled to the travel unit to an unlocked state, the door mechanically maintaining a state prior to decoupling in a state where the travel unit and the housing unit are decoupled; switch the state of the door of the housing unit coupled to the travel unit to the unlocked state when a release condition for releasing coupling to the housing unit is satisfied; and release the coupling of the travel unit and the housing unit in the unlocked state of the door when the release condition is satisfied.

According to these first to fifth example embodiments, in the transfer environment for retrieving the transport target, it is possible to ensure security by following electrical control to unlock the door part upon the establishment of a delivery condition. Furthermore, in the release environment for housing the transport target, by decoupling the housing unit from the travel unit in a mechanically unlocked state, it becomes possible to perform housing operations with the housing unit alone, ensuring the flexibility in housing. Therefore, it is possible to ensure the security in the delivery of the transport target and to ensure flexibility in the housing of the transport target.

The following will describe multiple embodiments of the present disclosure with reference to the drawings. Elements corresponding to each other among the embodiments are assigned the same numeral and their descriptions may be omitted. When only a part of a component is described in an embodiment, the other part of the component can be relied on the component of a preceding embodiment. Further, not only the combinations of the configurations explicitly shown in the description of the respective embodiments, but also the configurations of the multiple embodiments can be partially combined together even if the configurations are not explicitly described under a condition that there is no difficulty in the combination in particular.

First Embodiment

An autonomous travel control system 100 of a first embodiment controls traveling of an autonomous travel device 1 shown in FIG. 1. The autonomous travel device 1 is, for example, a transport robot that transports luggage as a transport target to a transport destination user through autonomous travel.

Figure 2:
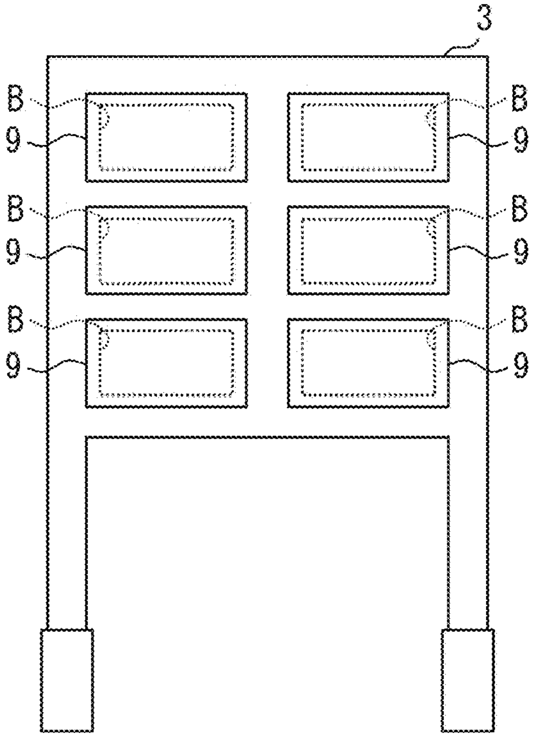
FIG. 2 is a view mainly showing a door part of a housing unit of the first embodiment.

The autonomous travel device 1 includes a travel unit 2 and a housing unit 3. The travel unit 2 is a unit driven by the autonomous travel control system 100. As shown in FIG. 2, the housing unit 3 is a unit that includes a housing box B and can house the transport target in the housing box B. The housing box B is a housing room that partitions a housing space for the transport target, and for example, is provided in multiple units in the housing unit 3. The housing unit 3 may be provided with wheels so that it can be moved by a peripheral person. The travel unit 2 and the housing unit 3 are detachably connected by a coupling part 8 described later.

Figure 3:
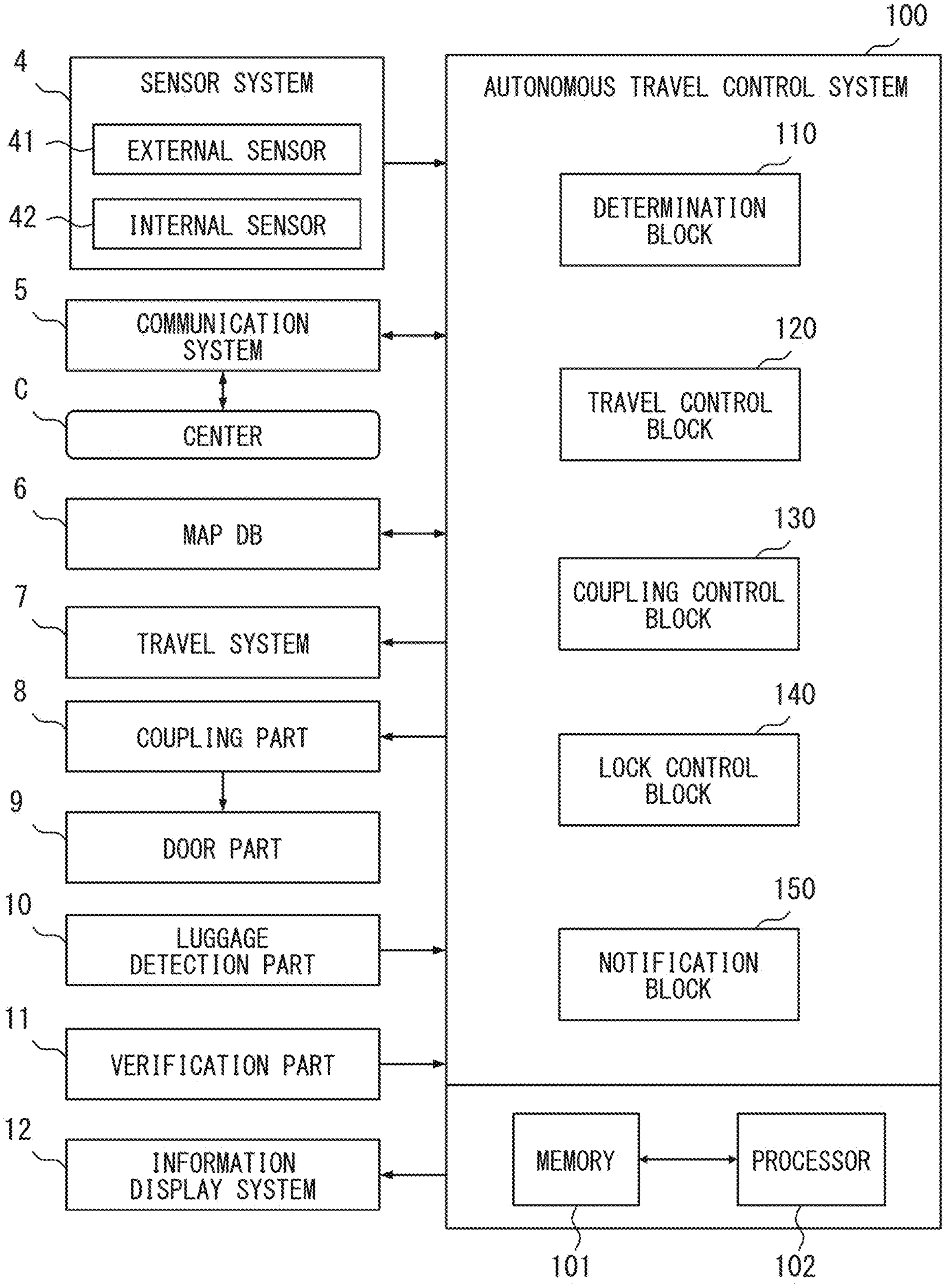
FIG. 3 is a block diagram showing a functional configuration of an autonomous travel control system according to the first embodiment.

The autonomous travel device 1 is equipped with a sensor system 4, a communication system 5, a map database 6, a travel system 7, the coupling part 8, a door part 9, a luggage detection part 10, a verification part 11, and an information presentation system 12, as shown in FIGS. 1 and 3.

The sensor system 4 acquires sensor information available to the autonomous travel control system 100 for both the external and internal environments of the autonomous travel device 1. Therefore, the sensor system 4 includes an external sensor 41 and an internal sensor 42.

The external sensor 41 is a peripheral environment sensor that acquires external information as sensor information from the external field, which is the peripheral environment of the autonomous travel device 1. The external sensor 41 may be of an object detection type, which detects an object existing in the external environment of the autonomous travel device 1. The external sensor 41, which detects an object, may be provided by at least one of a camera, a Light Detection and Ranging/Laser Imaging Detection and Ranging (LiDAR), a radar, a sonar, or the like. The external sensor 41 may include a contact sensor that detects contact with the peripheral object.

The external sensor 41 may acquire the external information by monitoring a state of the external environment. The external sensor 41 having an environmental monitoring type includes at least one type of, for example, a temperature sensor, a thermal camera, a wind sensor, and a flood detection sensor.

The internal sensor 42 acquires internal information as sensor information from the internal field, which is the internal environment of the autonomous travel device 1. The internal sensor 42 may be of a physical quantity-detecting type which detects a specific physical quantity of motion in the internal environment of the autonomous travel device 1. The internal sensor 42 of a physical quantity detection type is at least one type out of, for example, a traveling speed sensor, an acceleration sensor, a gyro sensor, and the like. In addition, the internal sensor 42 may include a door sensor that detects the opening and closing of the door part 9.

The communication system 5 acquires communication information available by the autonomous travel control system 100 through wireless communications. The communication system 5 may have a positioning type that receives positioning signals from an artificial satellite of a global navigation satellite system (GNSS) located outside the autonomous travel device 1. For example, the communication system 5 of the positioning type may be a GNSS receiver or the like. The communication system 5 may be V2X type communication system that exchanges communication signals with a Vehicle to Everything (i.e., V2X) system located in the external environment of the autonomous travel device 1. The communication system 5 of the V2X type may be at least one of a dedicated short range communications (i.e., DSRC) communication device, a cellular V2X (i.e., C-V2X) communication device, or the like. The autonomous travel device 1 can communicate with a center C that manages the operation via the V2X type communication system 5. The communication system 5 may be a terminal communication type that transmits and receives communication signals with terminals existing within the internal environment of the autonomous travel device 1. The terminal communication type communication system 5 is, for example, at least one of Bluetooth (registered trademark) equipment, Wi-Fi (registered trademark) equipment, infrared communication equipment, and the like.

The map database 6 stores map information available to the autonomous travel control system 100. The map database 6 includes at least one non-transitory tangible storage medium, such as a semiconductor memory, a magnetic medium, and an optical medium. The map database 6 may be a database of a locator that estimates self-state quantities including the self-position of the autonomous travel device 1. The map database 6 may be a database of a navigation unit that navigates the traveling route of the autonomous travel device 1. The map database 6 may be configured by combining various types of these databases.

The map database 6 acquires and stores the latest map information by, for example, communication with the center C via the V2X-type communication system 5. The map information is converted into two-dimensional or three-dimensional data as information indicating the traveling environment of the autonomous travel device 1. Digital data of a high definition map may be adopted as the three-dimensional map data. The map information may include road information indicating at least one of road position, road shape, road surface condition, or the like. The map information may include marking information, which indicates at least one of traffic sign attached to a road, lane mark position, or lane mark shape. The map information may include structure information indicating at least one of positions or shapes of a building and a traffic light along a road.

The travel system 7 is mounted in the travel unit 2 and implements the travel of the travel unit 2 by the autonomous travel control system 100. The travel system 7 includes a drive wheel, a drive motor that rotationally drives the drive wheel, and a motor control unit that controls the drive motor. The motor control unit drives the travel unit 2 by controlling the current to the drive motor based on control instructions (current instruction values) from the autonomous travel control system 100.

The coupling part 8 couples the housing unit 3 and the travel unit 2. The coupling part 8 electrically connects the housing unit 3 and the travel unit 2. The coupling part 8 forms an electrical path from a battery 13 of the travel unit 2 to the door part 9 of the housing unit 3 by coupling. The coupling part 8 may include locking claws and the like that mechanically couple the housing unit and the travel unit 2.

The door part 9 is configured to open and close the housing box B in the housing unit 3. The door part 9 is provided with multiple housing boxes B. The door part 9 includes a door panel that can close the housing box B, and an electric lock that locks (secures) and unlocks (releases) the door panel when it is closed. The electric lock is a type that can be mechanically switched between the locked state and the unlocked state by electrical control by the autonomous travel control system 100. The electric lock is of the type that maintains the state it was in during the last power-on when it is not powered. For example, the locking unit may be a motorized electric lock that mechanically repeats locking and unlocking by motor drive each time it is powered. Alternatively, the locking part may be an instant electric lock type case lock with a lever handle or knob, where the solenoid operates each time it is powered to mechanically repeat locking and unlocking.

With such an electric lock, the door part 9 is electrically controlled by the autonomous travel control system 100 to be in a locked state and an unlocked state in the coupled state of the travel unit 2 and the housing unit 3. Then, the door part 9 mechanically maintains the state before disconnection in the uncoupled state, that is, in the non-powered state, between the travel unit 2 and the housing unit 3.

The luggage detection part 10 is a non-contact sensor that detects luggage as the transport target housed in the housing box B. For example, the luggage detection part 10 is configured to include a RFID (Radio Frequency Identifier) reader. The luggage detection part 10 detects the housed transport target by reading the tag attached to the transport target with the RFID reader.

The verification part 11 matches the transport destination user who is permitted to retrieve the transport target from the housing unit 3. The verification part 11 accepts the input of the authentication code from the transport destination user. The configuration for receiving authentication codes includes a touch panel that accepts touch operations and a scanner that scans authentication codes as two-dimensional or one-dimensional codes. The verification part 11 authenticates that the destination user is the legitimate person when the authentication code stored in a memory 101 or a storage medium of the verification part 11 in the autonomous travel control system 100 matches the entered authentication code. The verification part 11 transmits the verification result information to the autonomous travel control system 100. In addition, the verification part 11 may transmit the acquired authentication code to the center C via the communication system 5. In this case, the matching of the transport destination user is performed at the center C, and the matching result is transmitted to the autonomous travel control system 100.

The information presentation system 12 presents notification information to a peripheral person in periphery of the autonomous travel device 1. The information presentation system 12 may be a visual presentation unit that presents notification information by stimulating the visual sense of the peripheral person. The visual presentation unit may include, for example, a monitor device that stimulates vision by displaying a video or an image, and a light emitting unit that stimulates vision by light emission of a lamp.

The information presentation system 12 may be an audio presentation unit that presents notification information by stimulating the auditory sense of the occupant. The audio presentation unit is at least one type of, for example, a speaker, a buzzer, a vibration unit, and the like.

The autonomous travel control system 100 is connected to the mounted configuration of the autonomous travel device 1 via at least one type of connection, such as a LAN (Local Area Network) line, wire harness, internal bus, or wireless communication line. The autonomous travel control system 100 includes at least one dedicated computer.

The dedicated computer constituting the autonomous travel control system 100 may be a travel control electronic control unit (ECU) that controls the driving of the autonomous travel device 1. The dedicated computer constituting the autonomous travel control system 100 may be a navigation ECU that navigates the autonomous travel device 1 along the travel route. The dedicated computer constituting the autonomous travel control system 100 may be a locator ECU that estimates the self-state quantity of the autonomous travel device 1. The dedicated computer constituting the autonomous travel control system 100 may be an actuator ECU that controls traveling actuators of the autonomous travel device 1. The dedicated computer constituting the autonomous travel control system 100 may be an HCU which is a human machine interface (HMI) control unit that controls information presentation in the autonomous travel device 1. The dedicated computer constituting the autonomous travel control system 100 may be, for example, a computer outside the autonomous travel device 1. For example, the dedicated computer may be a computer that constitutes a center, a mobile terminal, or the like capable of communicating via the V2X type communication system 5.

The dedicated computer constituting the autonomous travel control system 100 includes at least one memory 101 and at least one processor 102. The memory 101 is at least one type of non-transitory tangible storage medium, such as a semiconductor memory, a magnetic medium, and an optical medium, for storing, in non-transitory manner, computer readable programs and data. Here, the storage may refer to storage where data is retained even when the autonomous travel device 1 is turned off, or it may refer to temporary storage where data is erased when the autonomous travel device 1 is turned off. The processor 102 includes at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), a GSP (i.e., Graph Streaming Processor), or the like as a core.

In the autonomous travel control system 100, the processor 102 executes multiple commands included in an autonomous travel control program stored in the memory 101 in order to control the autonomous travel device 1. Thus, the autonomous travel control system 100 has functional blocks for controlling the autonomous travel device 1. The multiple functional blocks constructed in the autonomous travel control system 100 include a determination block 110, a travel control block 120, a coupling control block 130, a lock control block 140, and a notification block 150, as shown in FIG. 3. The autonomous travel control system 100 is an example of a "controller".

Figure 4:
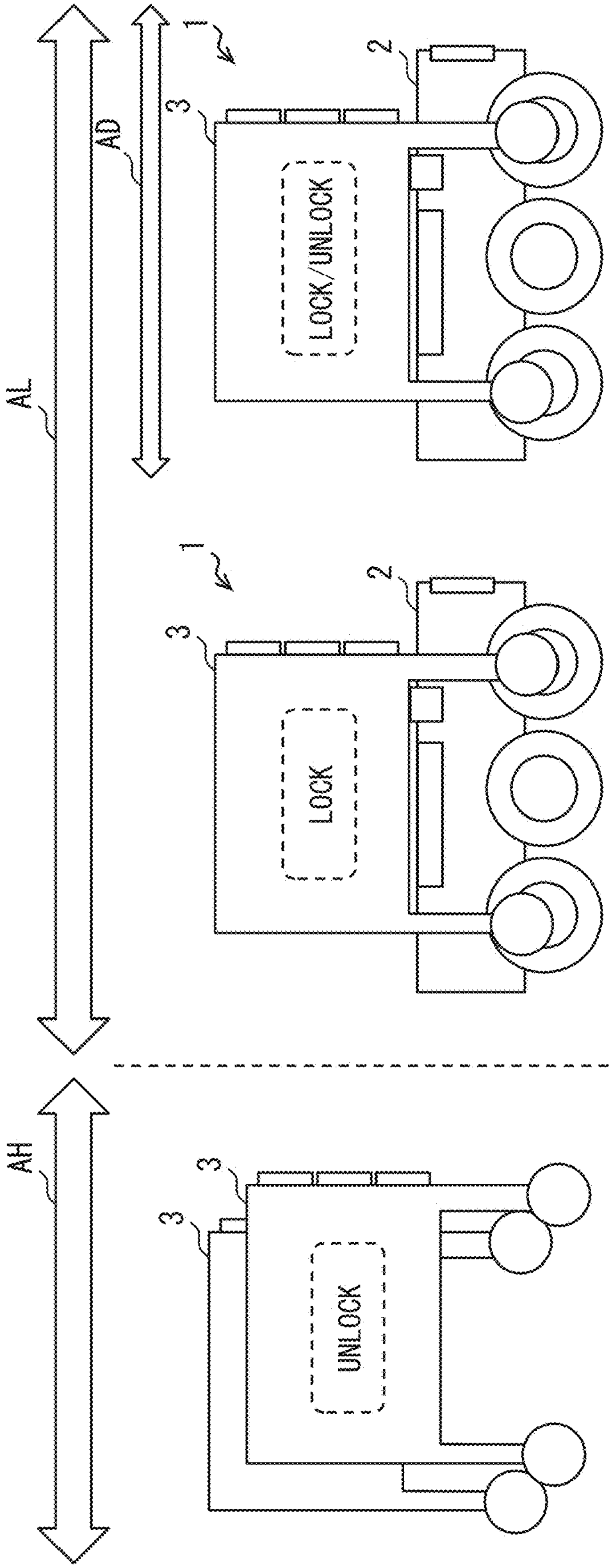
FIG. 4 is a schematic diagram showing a state of the door part of the autonomous travel device according to the first embodiment.

The determination block 110 makes the determination to switch a control phase of the autonomous travel device 1. The control phase includes a transport preparation phase, a transport phase, a delivery phase, and a release phase, as shown in FIG. 4 and the like. The transport preparation phase is a phase from coupling of the housing unit 3, packed with the transport target and the travel unit 2 in a high security area AH to the start of transport. The transport phase is a phase from the transport start to movement to a delivery area AD. The delivery phase is a phase in which the transport target is handed over to the transport destination user within the delivery area AD. The release phase is a phase in which, after the completion of delivery, it returns to the high security area AH and decouples the housing unit 3 from the travel unit 2.

The determination block 110 determines the switch to the transport preparation phase when the housing unit 3 is released (decoupled) from the travel unit 2 in the high security area AH. The high security area AH is considered to be a higher security area than the delivery area AD. Position information of the high security area AH is stored in advance in the memory 101 or the like. For example, the high security area AH is an area that is partitioned from persons other than the packing user and is such as a workplace where the packing user performs the task of packing the transport target into the housing unit 3.

The determination block 110 determines the switch to the transport phase when the travel to the delivery destination of the transport target starts after coupling with the housing unit 3. The determination block 110 determines the switch to the delivery phase when it arrives at the delivery area AD. The determination block 110 determines the switch to the release phase when the delivery of the transport target is completed and the vehicle starts moving to the high security area AH after the lock is executed.

The determination block 110 determines whether to permit the coupling of travel unit 2 and housing unit 3. The determination block 110 determines whether the coupling condition that permits coupling in the transport preparation phase is satisfied. The determination block 110 determines that execution of the coupling is permitted when the coupling condition is satisfied. For example, the determination block 110 determines that the coupling condition is satisfied when the travel unit 2 has arrived at a position where it can be coupled to the housing unit 3. For example, the determination block 110 may determine the position of the travel unit 2 based on at least one type or a combination of multiple types of external information, internal information, map information, and positioning information from the communication system 5 of the positioning type.

The determination block 110 determines whether to permit or whether to continue the execution of locking and unlocking the door part 9. The determination block 110 determines whether to permit the execution locking of the door part 9 when a lock condition that permits locking is satisfied after the coupling of the travel unit 2 and the housing unit 3 in the transport preparation phase. For example, the determination block 110 makes a determination on whether the lock condition is satisfied when both a transport target condition and a route condition are satisfied as a sub-condition. The transport target condition is, for example, that the transport target information obtained via the communication system 5 from the center C matches the transport target information regarding the actually housed transport target. The actual transport target object information is acquired, for example, by detection by the luggage detection part 10. Also, the route condition is that the setting of the delivery area AD and the travel route to the delivery area AD is completed.

The determination block 110 determines whether to permit the execution of unlocking when the delivery condition that permits the delivery of the transport target is satisfied during the delivery phase. For example, the determination block 110 determines whether the delivery condition is satisfied when a stop condition and a verification condition are satisfied as sub-conditions, and the suspicious condition is not satisfied.

Specifically, the determination block 110 makes a stop condition determination when the travel speed detected by the internal sensor 42 within the delivery area AD is equal to or less than the threshold. Also, the determination block 110 makes a determination on whether the verification condition is satisfied when the transport destination user is verified by the verification part 11. Also, the determination block 110 determines that the suspicious condition is not satisfied when no suspicious person is detected in the periphery. The determination block 110 detects a person who takes suspicious actions, such as shaking the autonomous travel device 1 or trying to open the locked door part 9, as a suspicious person. Suspicious actions are determined based on, for example, the information of a person detected by the external sensor 41 and the external force applied to the autonomous travel device 1 detected by the internal sensor 42. Alternatively, the determination block 110 may track the autonomous travel device 1 from the transport phase and detect any person who remains in the periphery after stopping in the reception phase as the suspicious person.

Also, the determination block 110 determines the continuation of the unlock when an unlock continuation condition, which permits the continuation of the unlock after the delivery condition is satisfied, is satisfied during the delivery phase. For example, the determination block 110 determines that the unlock continuation condition is satisfied when the stop condition is satisfied and the suspicious condition is not satisfied during unlocking.

Further, the determination block 110 determines re-locking permission of the lock part when a re-locking condition, which permits the lock of the door part 9 during the delivery phase, is satisfied. For example, the determination block 110 determines that the re-lock condition is satisfied when both a transport target removal condition and a door closing condition are satisfied as sub-conditions. Specifically, the determination block 110 determines that the transport target removal condition is satisfied when it is detected that the corresponding transport target has been taken out by the luggage detection part 10. Also, the determination block 110 determines that the door closing condition is satisfied when the close state of the door part 9 is detected by a door sensor or the like that detects the opening and closing of the door part 9.

Also, the determination block 110 determines that unlocking is permitted when the release condition that permits unlocking in the release phase is satisfied. For example, the determination block 110 determines that the release condition is satisfied based on arrival at the high security area AH. Alternatively, the determination block 110 may determine that the release condition is satisfied based on arrival at the high security area AH and the autonomous travel device 1 has stopped. In addition, when the release condition is satisfied, the decoupling after unlocking is also permitted, so it can be said that the release condition is a condition that permits decoupling after unlocking.

The travel control block 120 controls the travel by the travel unit 2. The travel control block 120 executes autonomous travel control by controlling the rotation speed of left and right motors of the travel system 7. The travel control block 120, in the transport preparation phase, executes coupling preparation travel to couple with the housing unit 3 when it acquires the transport instruction from the center C via the communication system 5. In preparation for coupling travel, the travel control block 120 generates a travel route to a position where it can be coupled to the assigned housing unit 3 and executes travel to that position. In the transport preparation phase, the travel control block 120 generates a travel route to the delivery area AD, which is the transport destination, based on the transport instruction when the instruction is acquired. The delivery area AD is an area that permits delivery by the transport destination user within the low security area AL, which has lower security than the high security area AH. The delivery area AD may be an area that includes the location of the transport destination user, or it may be an area that includes the delivery location set by the transport destination user or the center C, etc. In addition, the travel control block 120 may generate a travel route at any timing from when the transport instruction is acquired to when the coupling is completed. The travel control block 120 starts the transport travel to transport the transport target when the door part 9 is locked based on the determination that the lock condition is satisfied. Thereby, the phase shifts to the transport phase.

In the transport phase, the travel control block 120 executes the travel control of the travel unit 2 according to the generated travel route. Upon reaching the destination, the travel control block 120 stops the travel unit 2. Upon arrival at the destination, the phase shifts to the delivery phase. In the delivery phase, the travel control block 120 maintains the stop of the travel unit 2. In the transfer phase, when the delivery of the transport target is completed and the lock is executed due to the re-lock condition being satisfied, the release travel to release the housing unit 3 starts. Thereby, the control phase shifts to the release phase. Alternatively, when the delivery of all transport targets has not been completed, the transport travel starts to the next delivery area AD.

In the release phase, the travel control block 120 causes the travel unit 2 to travel to the high security area AH. After arrival at the high security area AH, when the release condition is satisfied, the door part 9 is unlocked and the housing unit 3 is decoupled, and then post-release travel is performed. In the post-release travel, the travel control block 120 causes the travel unit 2 to travel to the standby area until the next transport. In addition, when a new transport instruction is acquired before traveling to the standby area, the travel control block 120 may transition to transport preparation travel before traveling to the standby area.

The coupling control block 130 switches and controls the coupling and decoupling of the housing unit 3 and the travel unit 2 by the coupling part 8. The coupling control block 130 controls the coupling part 8 during the transport preparation phase when the coupling condition is determined to be satisfied by the determination block 110, and executes the coupling of the housing unit 3, where the door part 9 is in the unlocked state, with the travel unit 2. The coupling control block 130 maintains the coupling state during the transport phase and the delivery phase.

Also, the coupling control block 130 executes the decoupling of the housing unit 3, whose door part 9 is in the unlocked state, from the travel unit 2 when the release condition is determined to be satisfied in the determination block 110 during the release phase.

Figure 5:
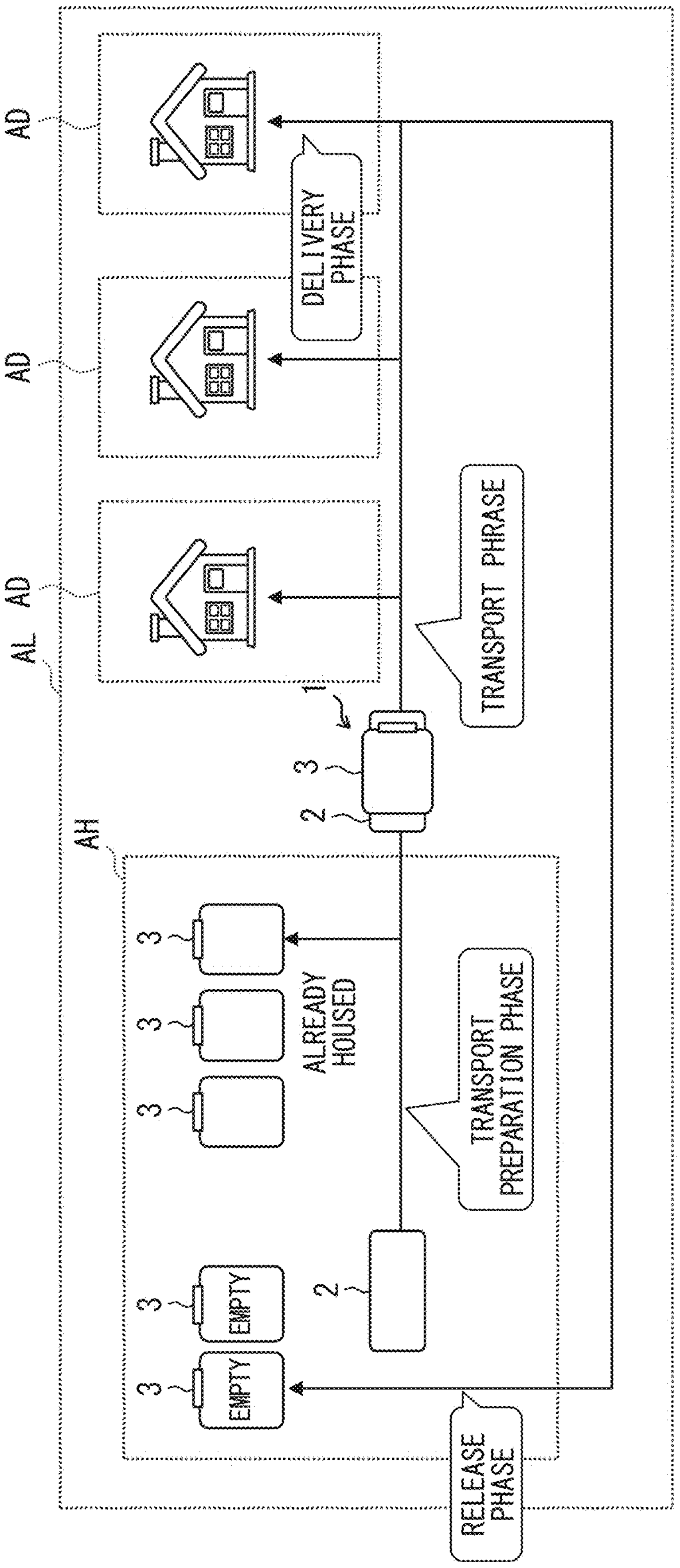
FIG. 5 is a schematic diagram showing a travel environment of the autonomous travel device according to the first embodiment.

The lock control block 140, as shown in FIG. 5 and the like, switches and controls the locking and unlocking of the door part 9 in the housing unit 3 in the coupled state with the travel unit 2. In the transport preparation phase, the lock control block 140 executes the lock when the lock condition is determined to be satisfied in the determination block 110. In the transport phase, the lock control block 140 maintains the locked state.

In the delivery phase, the lock control block 140 executes unlocking when the determination block 110 determines that the delivery condition is satisfied. Also, in the delivery phase, the lock control block 140 continues the unlock when the unlock continuation condition is satisfied after unlocking, and executes the lock when the unlock continuation condition is not satisfied. After locking due to the failure to satisfy the unlock continuation condition, the lock control block 140 executes the unlock when it is determined that the delivery condition is satisfied again. Also, during the delivery phase, the lock control block 140 executes the lock when it is determined that the re-lock condition is satisfied.

In the release phase, the lock control block 140 continues to lock until the release condition is determined to be satisfied. Then, when the release condition is satisfied, the lock control block 140 executes the unlock before the decoupling of the housing unit 3 and the travel unit 2.

The notification block 150 executes notifications to peripheral people of the autonomous travel device 1. For example, the notification block 150 executes a continuation impossible notification when the unlock continuation condition is not satisfied during the delivery phase. Specifically, the notification block 150 may issue a warning notification that the autonomous travel device 1 is moving when the stop condition is not satisfied among the sub-conditions. Also, the notification block 150 may issue the warning notification of the presence of the suspicious person when the suspicious condition is satisfied among the sub-conditions.

Also, the notification block 150 executes a re-lock impossible notification even when the re-lock condition is not satisfied in the delivery phase. Specifically, the notification block 150 may provide notification about the remaining transport object when the transport target removal condition is not satisfied among the sub-conditions. Also, the notification block 150 may issue a warning that the door part 9 is open when the door closing condition is not satisfied among the sub-conditions.

Through the collaboration of the blocks 110, 120, 130, and 140 described above, the autonomous travel control method by which the autonomous travel control system 100 controls the autonomous travel device 1 is executed according to autonomous travel control flows shown in FIGS. 6 to 10. This autonomous travel control flow is repeatedly executed while the autonomous travel device 1 is running. Note that each "S" in this autonomous traveling control flow described below means each of multiple processes executed by multiple commands included in the autonomous travel control program.

Figure 6:
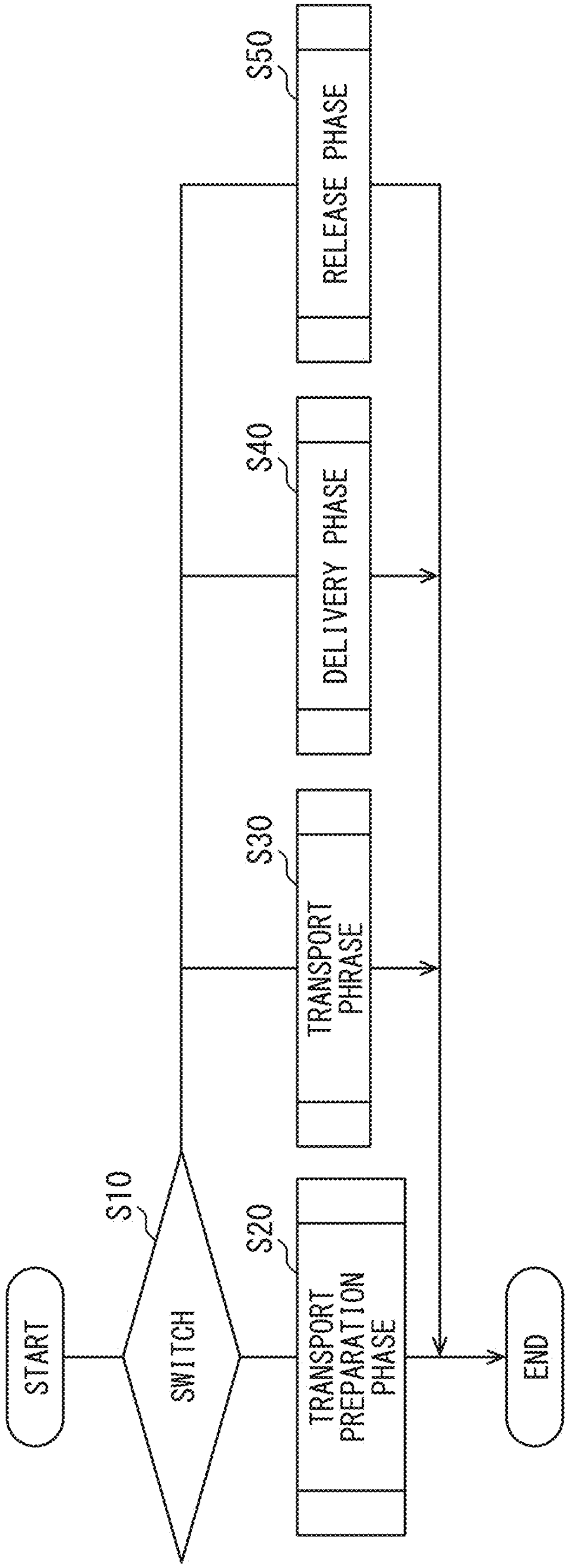
FIG. 6 is a flowchart showing an autonomous travel control flow according to the first embodiment.
Figure 7:
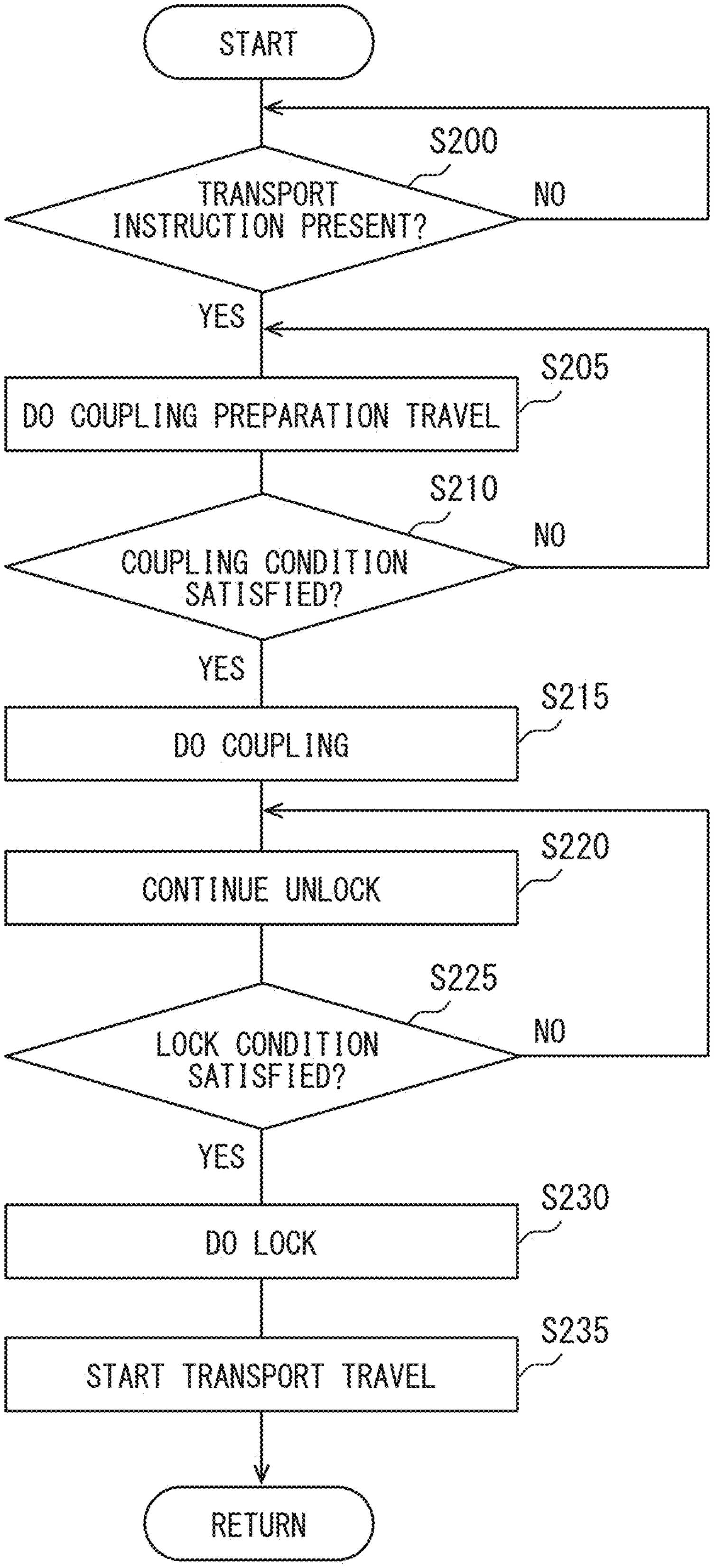
FIG. 7 is a flowchart showing an autonomous travel control flow according to the first embodiment.

First, in S10 of FIG. 6, the determination block 110 makes a determination to switch the current control phase. The determination block 110 determines the switch to the transport preparation phase and the process shifts to S20 when the housing unit 3 and the travel unit 2 are in the decoupled state in the high security area AH. The determination block 110, when the transport travel starts, makes a determination to switch to the transport phase and the process shifts to S30. When the determination block 110 arrives at the delivery area AD, it makes a determination to switch to the delivery phase and the process shifts to S40. The determination block 110, upon completion of the delivery of all transport targets, makes a determination to switch to the release phase and the process shifts to S50.

The autonomous travel control method in each control phase will be described according to FIGS. 7 to 10. First, in the transport preparation phase, in S200 of FIG. 7, the travel control block 120 determines whether there is the transport instruction from the center C. Until the transport instruction is acquired, the travel unit 2 continues to wait in the high security area AH. When it is determined that the transport instruction has been acquired, this flow shifts to S205.

In S205, the travel control block 120 executes the coupling preparation travel. As a result, the travel control block 120 drives the travel unit 2 to a position where it can be coupled with the housing unit 3 assigned by the transport instruction. In the subsequent S210, the determination block 110 determines whether the coupling condition is satisfied. When it is determined that the coupling condition is not satisfied, this flow returns to S205, and the travel control block 120 executes the coupling preparation travel again.

When it is determined that the coupling condition is satisfied, this flow shifts to S215. In S215, the coupling control block 130 executes the coupling of the travel unit 2 and the housing unit 3 in the unlocked state by controlling the coupling part 8. After the coupling, the lock control block 140 continues to be in the unlocked state in S220. In S225, the determination block 110 determines whether the lock condition is satisfied. When it is determined that the lock condition is not satisfied, the flow returns to S220 and the unlocked state is maintained.

On the other hand, when the lock condition is determined to be satisfied, this flow shifts to S230. In S230, the lock control block 140 executes the locking of the door part 9. In the subsequent S235, the travel control block 120 starts the transport travel to the delivery area AD.

Figure 8:
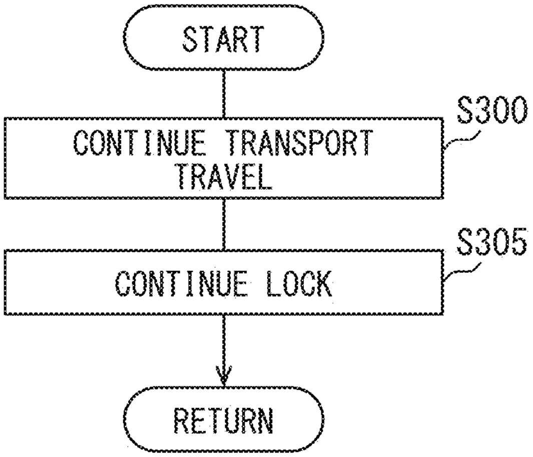
FIG. 8 is a flowchart showing an autonomous travel control flow according to the first embodiment.

In the transport phase, the travel control block 120 continues the transport travel in S300 of FIG. 8, and the lock control block 140 maintains the locked state in S305. The above process is repeatedly executed until the determination block 110 determines the switch to the delivery phase due to arrival at the delivery area AD in S10 of FIG. 6.

Figure 9:
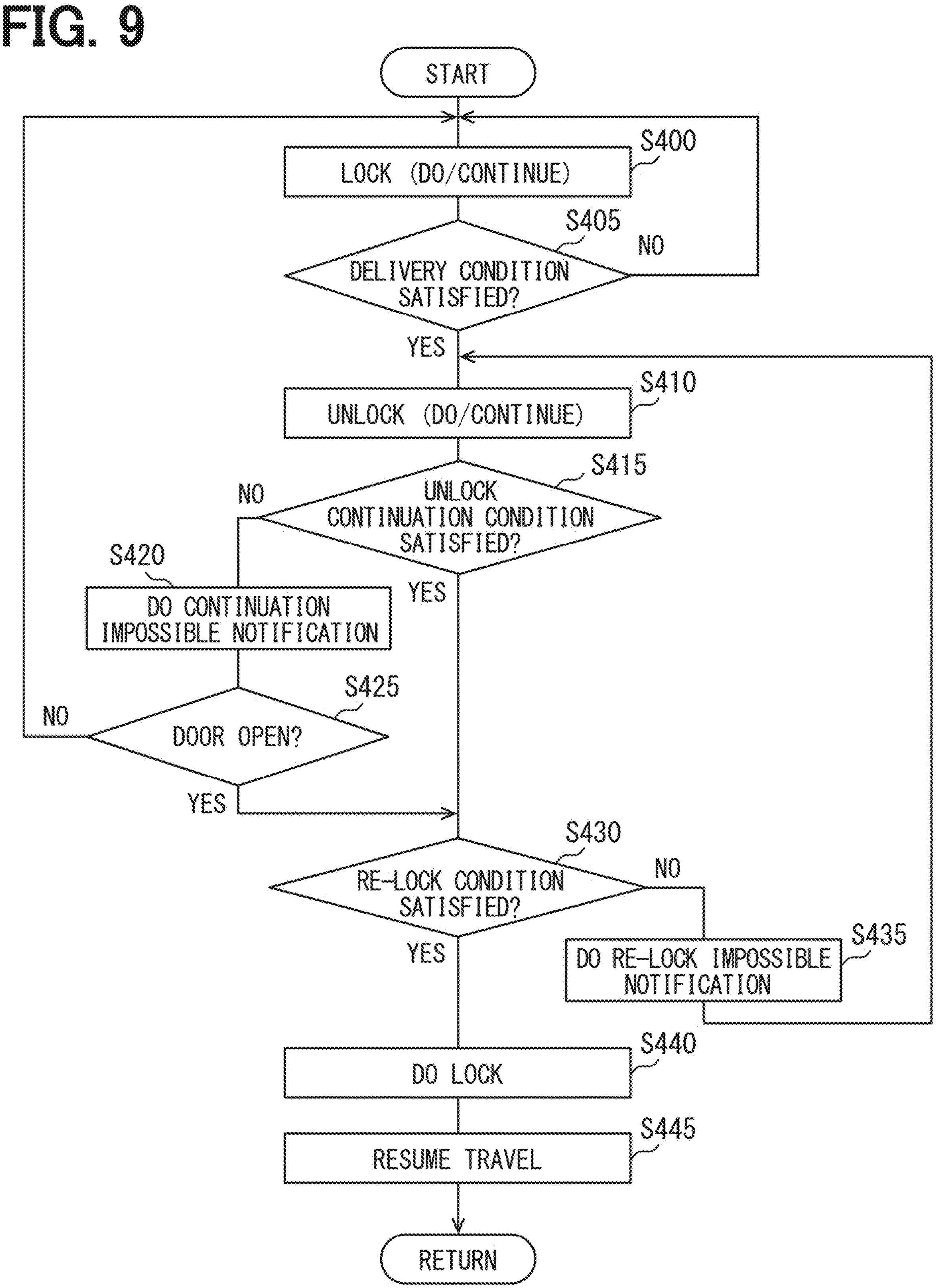
FIG. 9 is a flowchart showing an autonomous travel control flow according to the first embodiment.

In the delivery phase, while the lock control block 140 continues to be in the locked state in S400 of FIG. 9, the determination block 110 determines whether the delivery condition is satisfied in S405. When it is determined that the delivery condition is not satisfied, this flow returns to S400 and the locked state is maintained.

On the other hand, when it is determined that delivery condition is satisfied, this flow shifts to S410. In S410, the lock control block 140 executes the unlock. In the subsequent S415, the determination block 110 determines whether the unlock continuation condition is satisfied. When it is determined that the unlock continuation condition is satisfied, this flow shifts to S430.

On the other hand, when it is determined that the unlock continuation condition is not satisfied, this flow shifts to S420. In S420, the notification block 150 executes a continuation impossible notification. After that, in S425, the determination block 110 determines whether the door part 9 is in an open state or a close state. When it is determined that the door is closed, this flow returns to S400, and the door part 9 is locked. On the other hand, when it is determined to be in the close state, this flow shifts to S430.

In S430, the determination block 110 determines whether the re-lock condition is satisfied. When it is determined that the re-lock condition is not satisfied, this flow shifts to S435. In S435, the notification block 150 executes the re-lock impossible notification. After the process of S435, the flow returns to S410.

On the other hand, when it is determined that the re-lock condition is satisfied, this flow proceeds to S440. In S440, the lock control block 140 executes the lock. In the subsequent S445, the travel control block 120 resumes the travel of the autonomous travel device 1. Specifically, the travel control block 120 resumes travel when there are any transport targets that have not been delivered, and starts the release travel when the delivery of all transport targets is complete.

Figure 10:
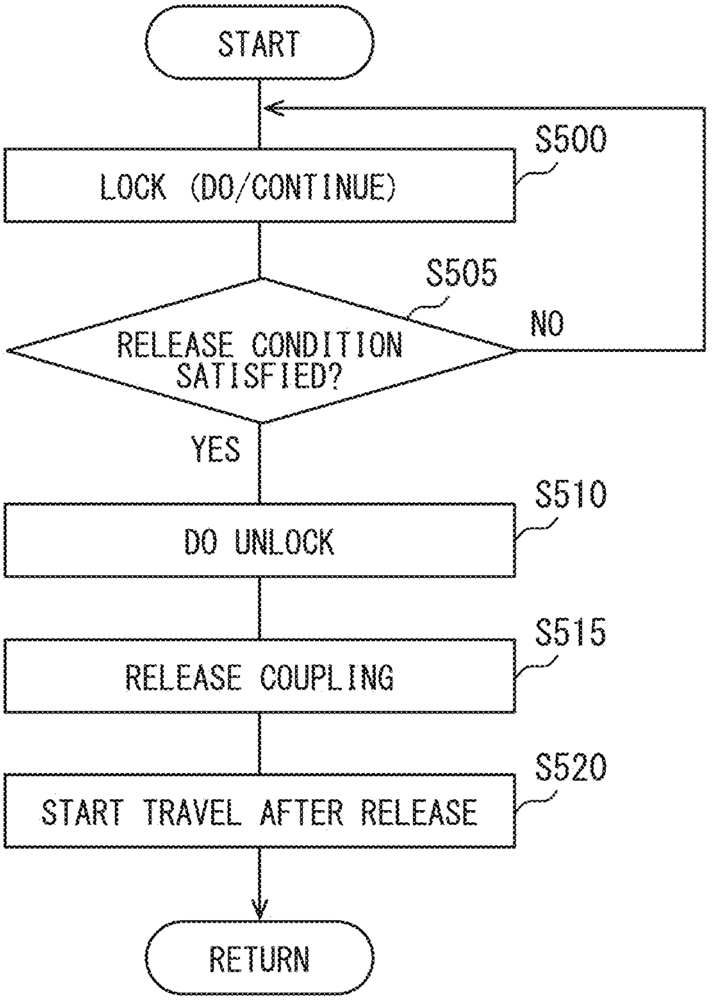
FIG. 10 is a flowchart showing an autonomous travel control flow according to the first embodiment.
Figure 11:
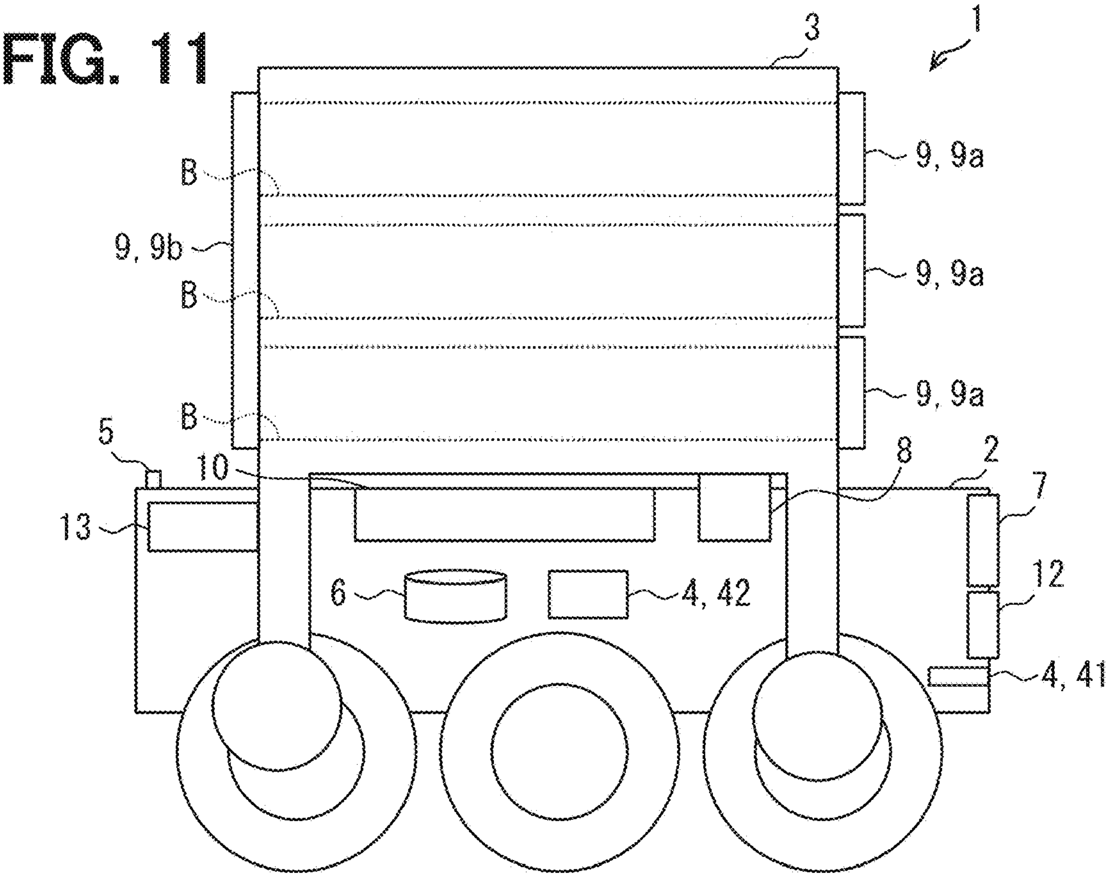
FIG. 11 is a schematic diagram showing an overall configuration of a second embodiment.

In the release phase, while the lock control block 140 continues the lock in S500 of FIG. 10, the determination block 110 determines whether the release condition is satisfied in S505. When it is determined that the release condition is not satisfied, this flow returns to S500 and the locked state is maintained.

On the other hand, when it is determined that the release condition is satisfied, this flow shifts to S510. In S510, the lock control block 140 executes the unlock. In the subsequent S515, the coupling control block 130 executes the decoupling of the unlocked housing unit 3 and the travel unit 2. When the decoupling is executed, the travel control block 120 starts the post-release travel in S520.

According to the first embodiment described above, in the delivery environment for retrieving the transport target, it is possible to ensure security by electrically controlling the unlock of the door part 9 based on determination that the delivery condition is satisfied. Furthermore, in the release environment for housing the transport target, by decoupling the housing unit 3 from the travel unit 2 in the mechanically unlocked state, it is possible to perform housing work with the housing unit alone, and ensure the housing flexibility. Therefore, it is possible to ensure the security in the delivery of the transport target and to ensure flexibility in the housing of the transported object.

Second Embodiment

As shown in FIGS. 11 to 17, a second embodiment is a modification of the first embodiment.

In the second embodiment, the door part 9 of the housing unit 3 includes a first door part 9*a* and a second door part 9*b*. The first door part 9*a* includes a door panel that can close the housing box B and an electronic lock that locks the door panel when it is closed. The first door part 9*a*, like the door part 9 in the first embodiment, is provided in multiple numbers for each housing box B. The first door part 9*a* is a door part 9 that opens and closes for the delivery of the transport target during the delivery phase.

Figure 12:
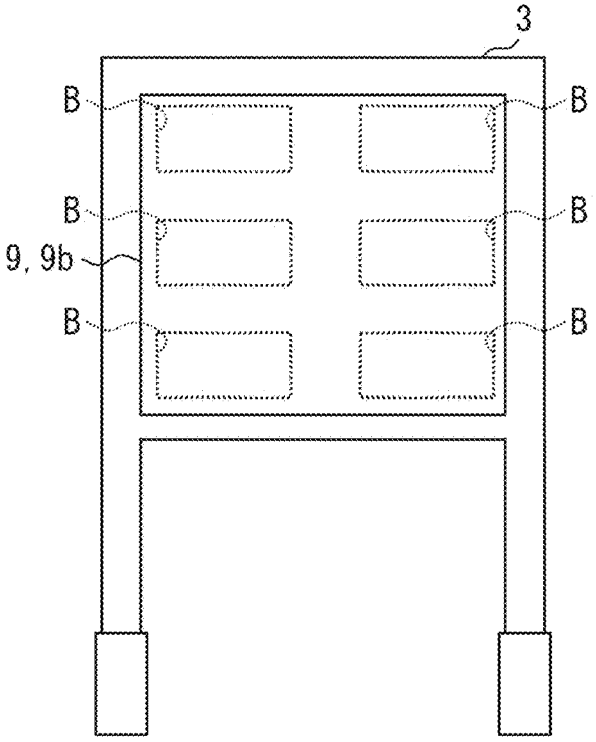
FIG. 12 is a view mainly showing a second door part of a housing unit of the second embodiment.

The second door part 9*b* is a door part 9 that can close the housing box B separately from the first door part 9*a*. The second door part 9*b*, like the first door part 9*a*, includes a door panel that can close the housing box B and an electronic lock that locks the door panel when it is closed. The second door part 9*b* is able to close multiple housing boxes B individually, as shown in FIG. 12. For example, the second door part 9*b* is able to close all the housing boxes B on its own. The second door part 9*b* is a door part that opens and closes for loading the transport target during the transport preparation phase.

Figure 13:
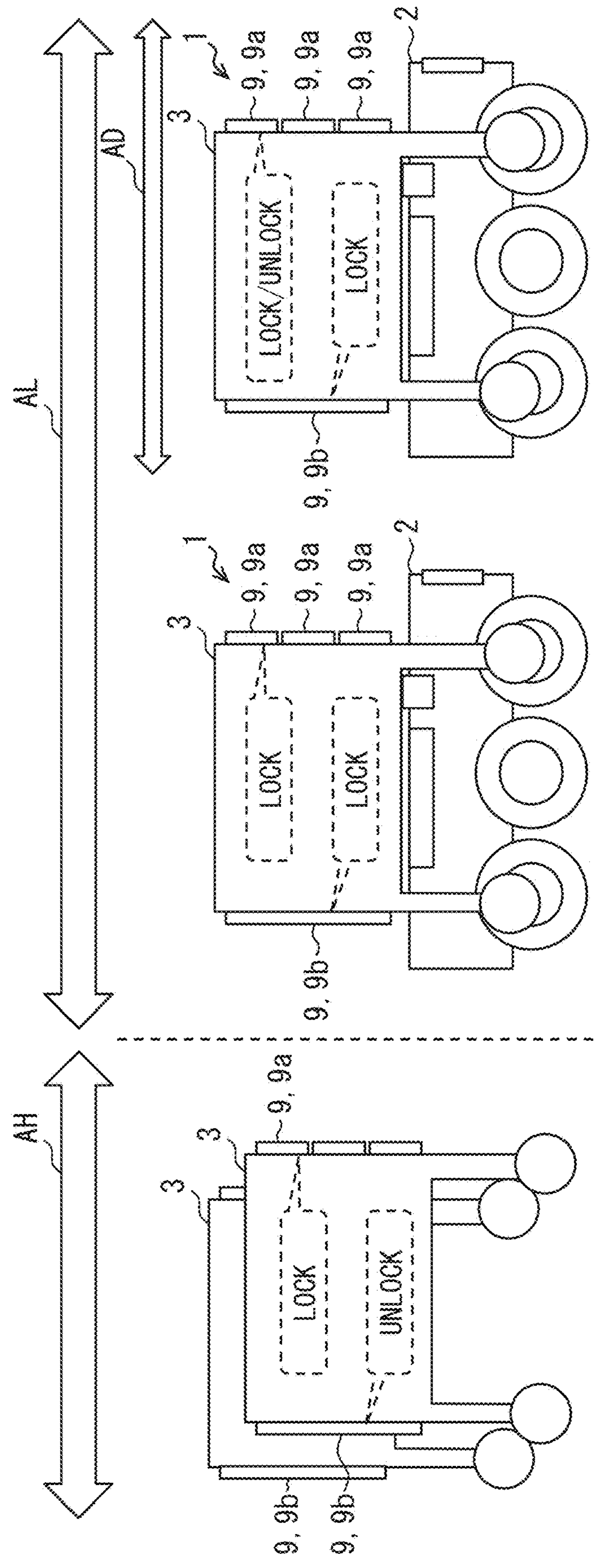
FIG. 13 is a schematic diagram showing a state of the door part of the autonomous travel device according to the second embodiment.

The first door part 9*a* and the second door part 9*b* are both controlled to switch between the locked state and the unlocked state by the autonomous travel control system 100. The first door part 9*a* and the second door part 9*b* can each be individually controlled to switch between the locked state and the unlocked state, as shown in FIG. 13.

The lock control block 140 of the autonomous travel control system 100 locks the first door part 9*a* and unlocks the second door part 9*b* when the release condition is determined to be satisfied during the release phase. In other words, the lock control block 140 sets the first door part 9*a* to the locked state and the second door part 9*b* to the unlocked state before decoupling the housing unit 3 and the travel unit 2 in the high security area AH. That is, the lock control block 140 controls the state of the door part 9 so that the transport target can be packed from the second door part 9*b* after the housing unit 3 is separated from the travel unit 2. Also, the lock control block 140 continues to lock each door part 9*a*, 9*b* during the transport phase.

Also, the lock control block 140 unlocks the first door part 9*a* and keeps the second door part 9*b* locked during the transfer phase when the delivery condition is determined to be satisfied. In other words, the lock control block 140 controls the state of the door part 9 so that the transport target can be taken out from the first door part 9*a* when the transport target is delivered in the low security area AL.

Furthermore, in the delivery phase, when the lock control block 140 determines that the unlock continuation condition is satisfied with the first door part 9*a* in the close state, the state of the first door part 9*a* is changed to the locked state.

Additionally, in the transfer phase, when it is determined that the re-lock condition is satisfied, the lock control block 140 sets the first door part 9*a* to the locked state.

In the second embodiment, the autonomous travel control method in each control phase where the autonomous travel control system 100 controls the autonomous travel device 1 is executed according to the autonomous travel control flow shown in FIGS. 14 to 17. For the processes denoted by the same reference numerals as in the first embodiment in FIGS. 14 to 17, the description in the first embodiment is applied.

Figure 14:
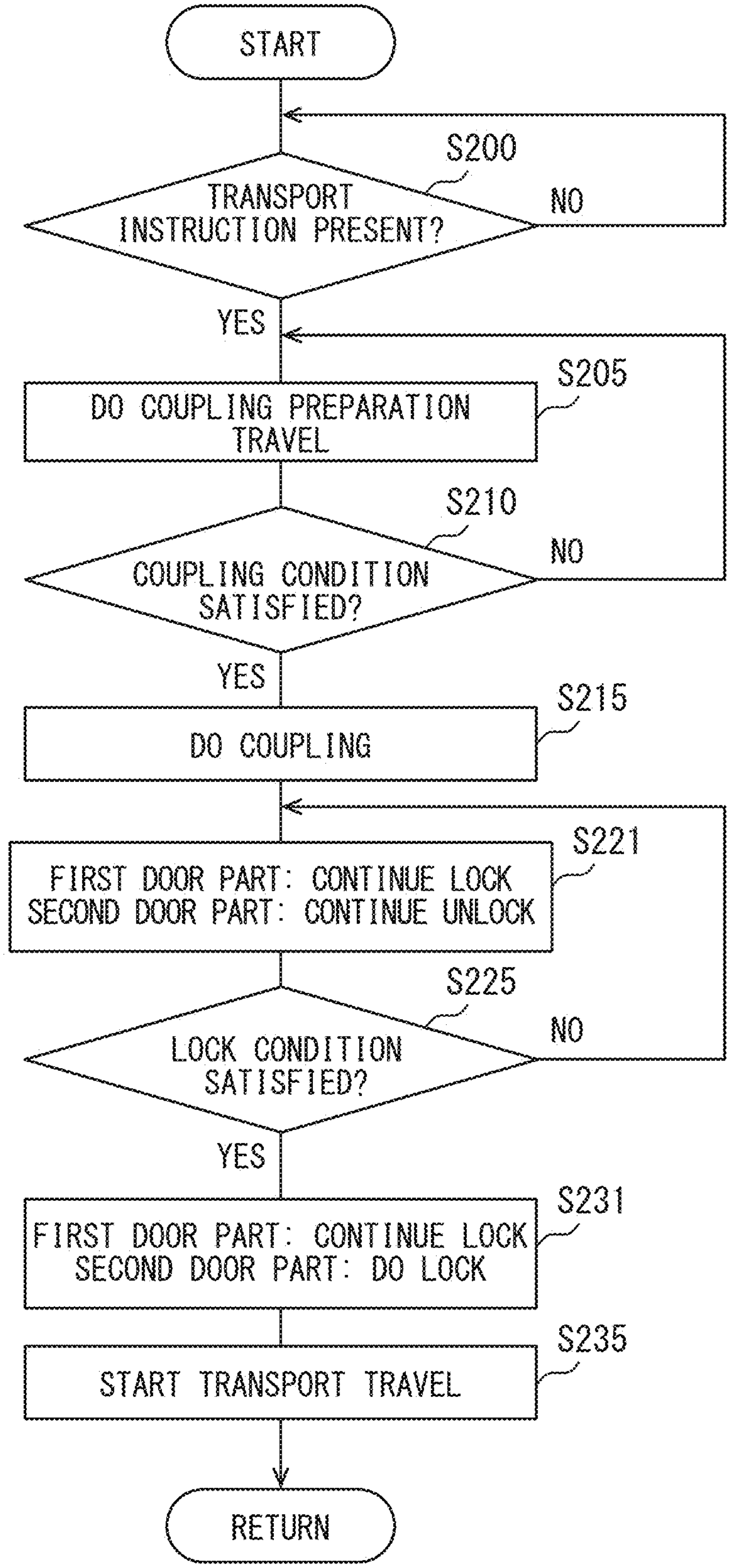
FIG. 14 is a flowchart showing an autonomous travel control flow according to the second embodiment.

In the transport preparation phase, when the coupling of the travel unit 2 and the unlocked housing unit 3 is executed in S215 of FIG. 14, this flow shifts to S221. In S221, the lock control block 140 maintains the locked state of the first door part 9*a* and the unlocked state of the second door part 9*b*. After the process of S221, the flow shifts to S225.

When the lock condition is determined to be satisfied in S225, this flow shifts to S231. In S231, the lock control block 140 continues to lock the first door part 9*a* while executing the lock of the second door part 9*b*. After the process of S231, this flow shifts to S235.

Figure 15:
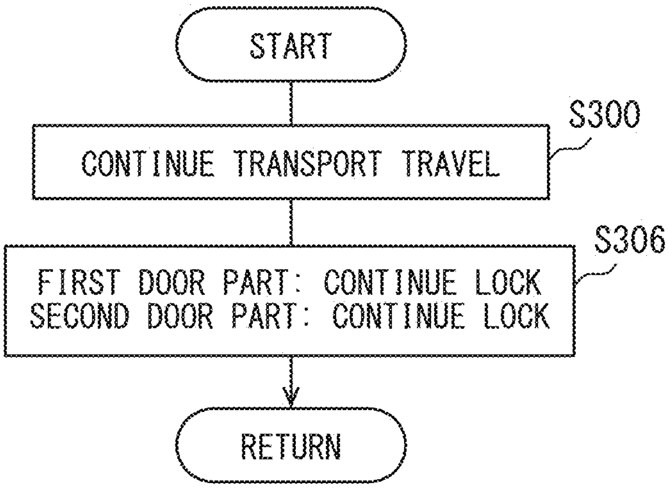
FIG. 15 is a flowchart showing an autonomous travel control flow according to the second embodiment.

In the transport phase, after S300 in FIG. 15, this flow shifts to S306. In S306, the lock control block 140 maintains the lock state of the first door part 9*a* and the second door part 9*b*. The above process is repeatedly executed until the determination block 110 determines the switch to the delivery phase due to arrival at the delivery area AD in S10 of FIG. 6.

Figure 16:
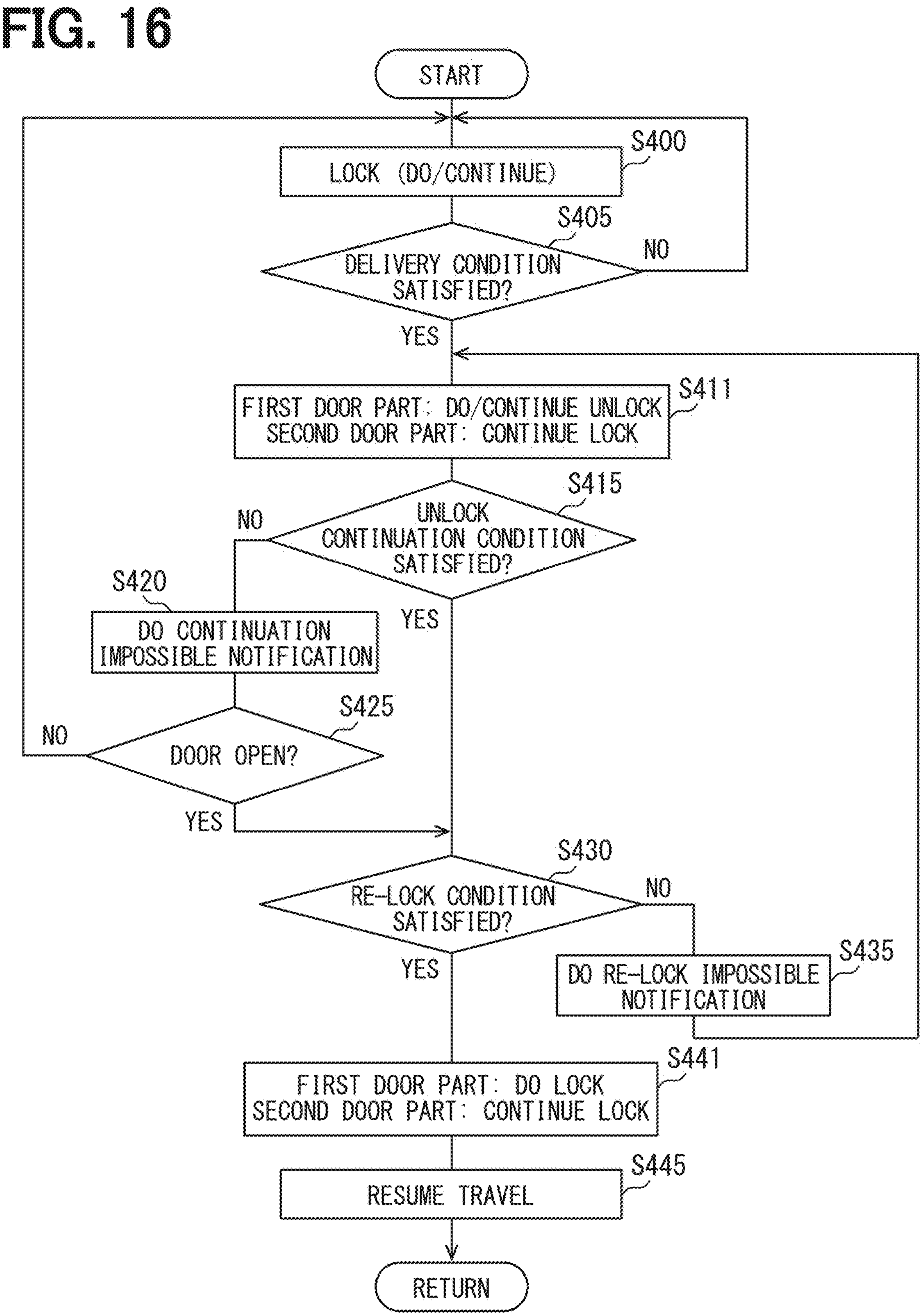
FIG. 16 is a flowchart showing an autonomous travel control flow according to the second embodiment.

In the delivery phase, while the lock control block 140 continues the lock state of each door part 9*a*, 9*b* in S400 of FIG. 16, when the delivery condition is determined to be satisfied in S405, this flow shifts to S411. In S411, the lock control block 140 executes the unlocking of the first door part 9*a* and maintains the lock of the second door part 9*b*. After the process of S411, the flow shifts to S415.

When the re-locking condition is determined to be satisfied in S430, this flow shifts to S441. In S441, the lock control block 140 executes the lock of the first door part 9*a* and continues the lock of the second door part 9*b*. After the process of S441, the flow shifts to S445.

Figure 17:
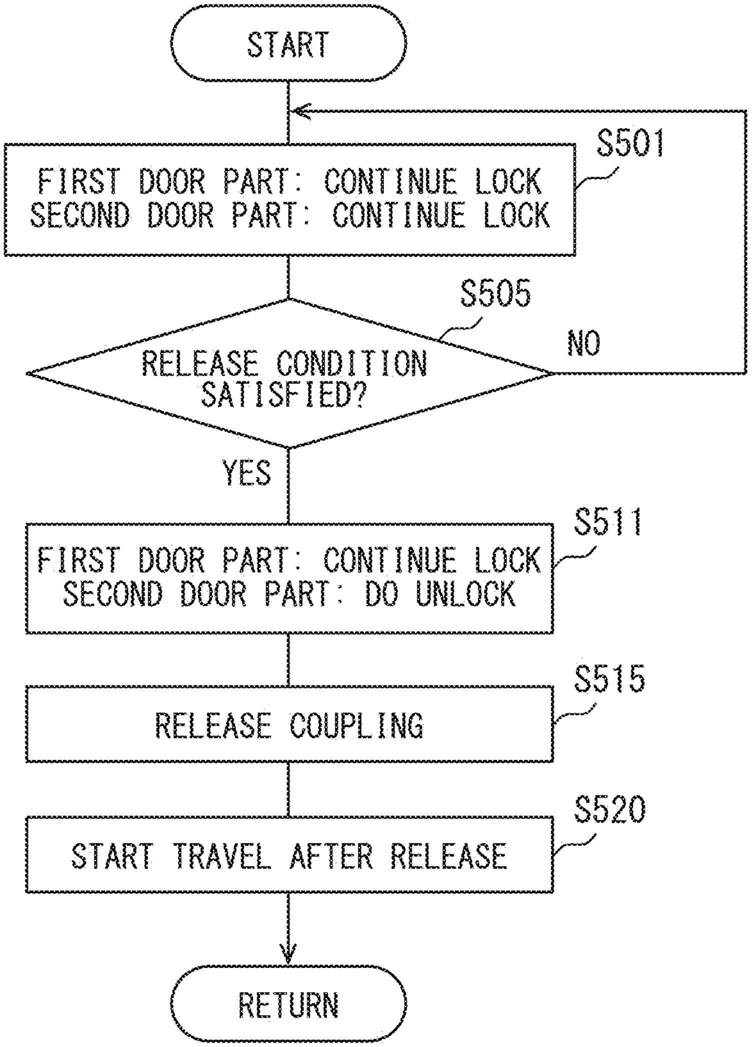
FIG. 17 is a flowchart showing an autonomous travel control flow according to the second embodiment.

In the release phase, the lock control block 140 continues to lock the first door part 9*a* and the second door part 9*b* at S501 in FIG. 17. When the release condition is determined to be satisfied in S505, this flow shifts to S511. In S511, the lock control block 140 continues to lock the first door part 9*a* while unlocking the second door part 9*b*. After the process of S511, the flow shifts to S515.

Third Embodiment

Figure 18:
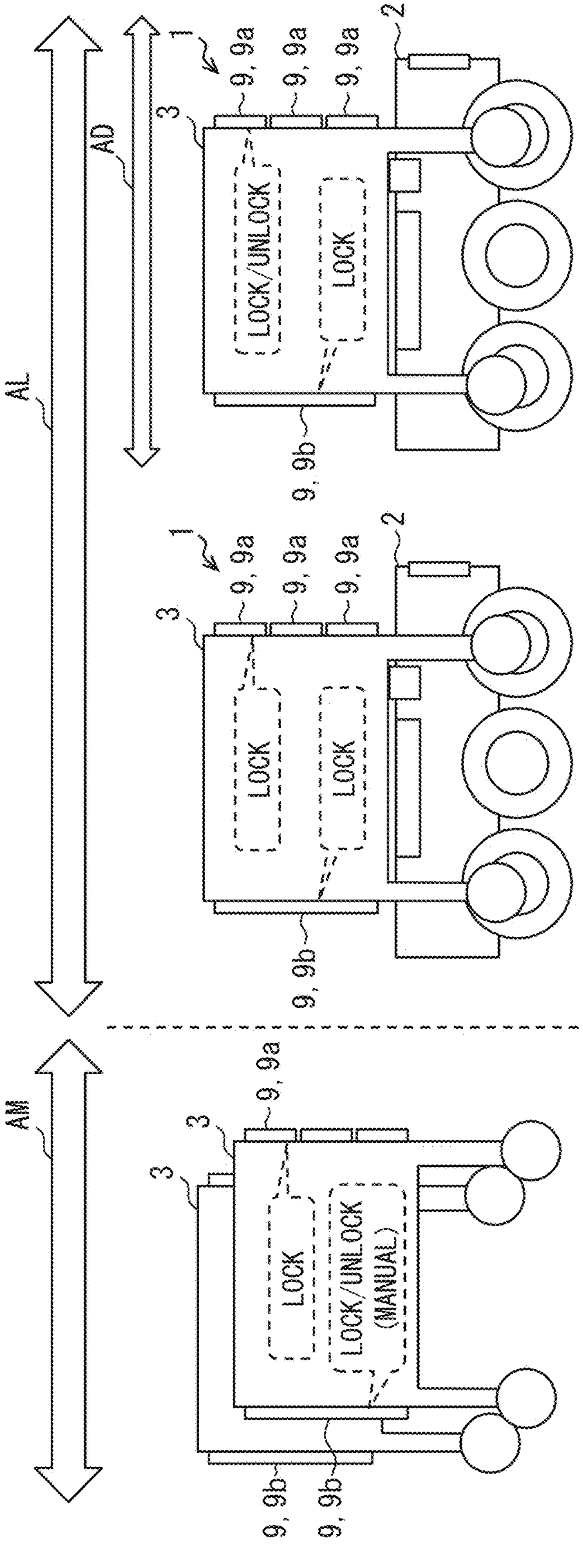
FIG. 18 is a schematic diagram showing a state of the door part of the autonomous travel device according to a third embodiment.
Figure 19:
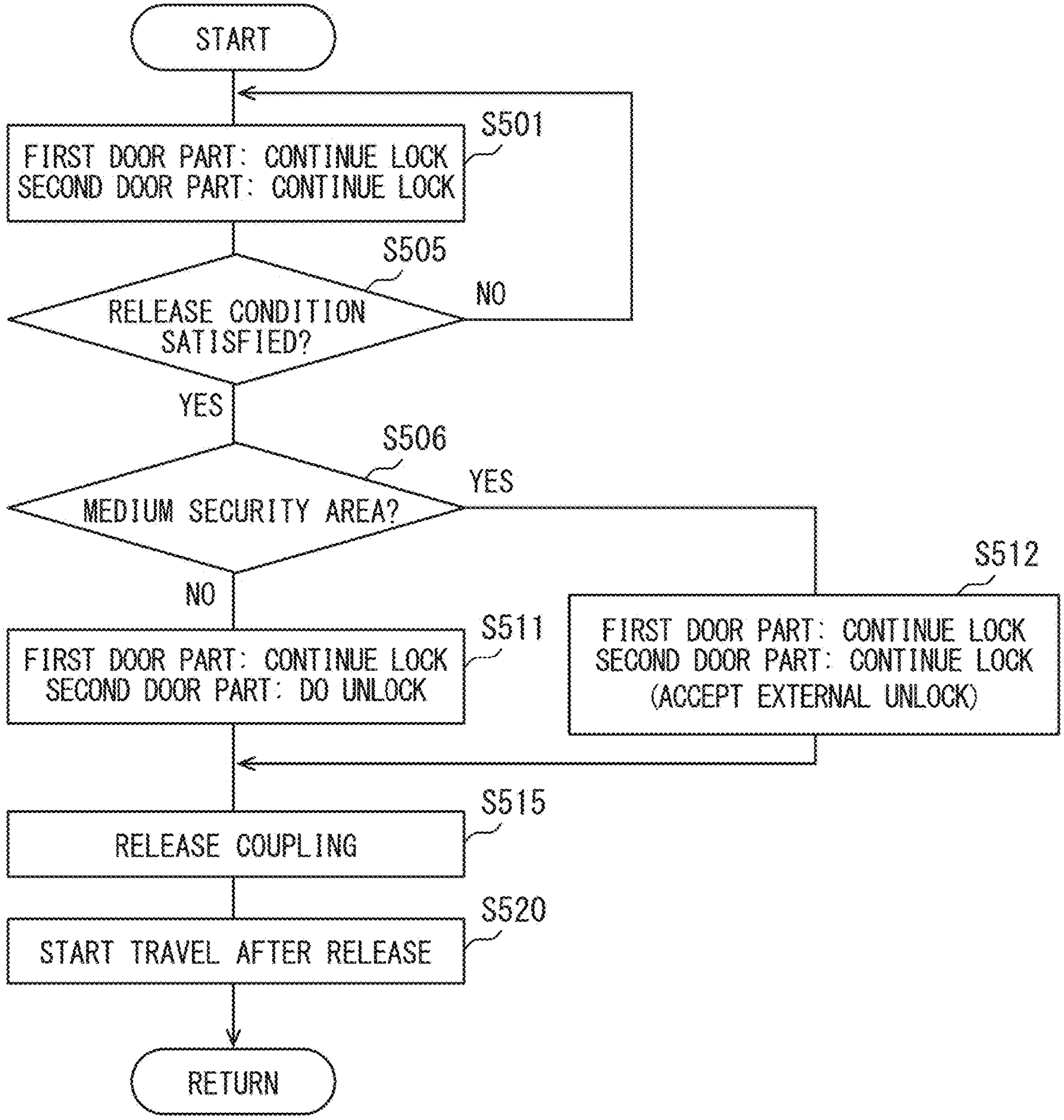
FIG. 19 is a flowchart showing an autonomous travel control flow according to the third embodiment.
Figure 20:
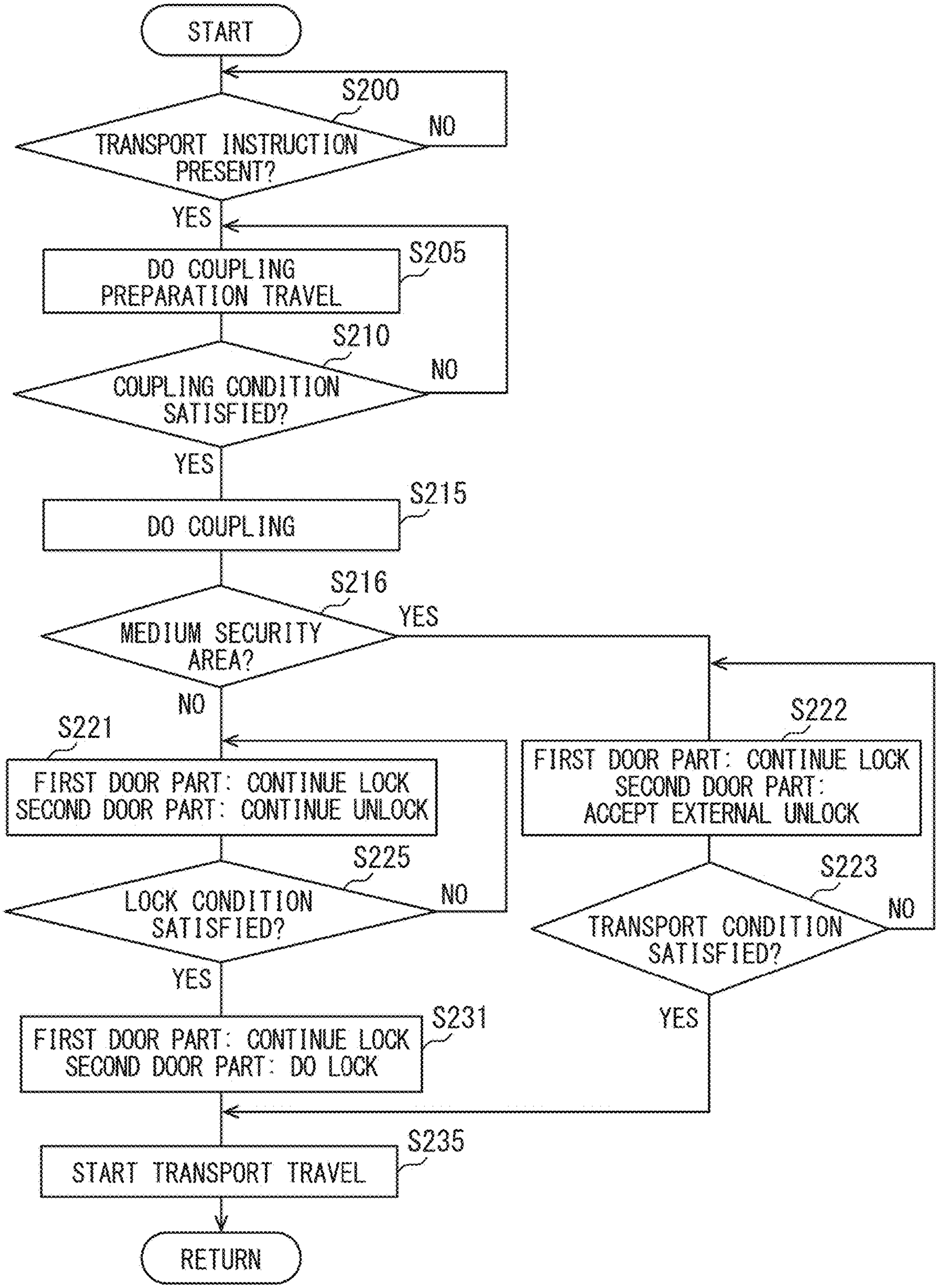
FIG. 20 is a flowchart showing an autonomous travel control flow according to the third embodiment.

A third embodiment shown in FIGS. 18 to 20 is a modification of the first embodiment.

The second door part 9*b* permits the lock and unlock by user operation in addition to electrical lock and unlock control. For example, the second door part 9*b* may be locked and unlocked by a key owned by the user who packs the transport target, such as a mechanical key or an electronic key. Alternatively, the second door part 9*b* may be capable of being locked and unlocked through authentication by a PIN code or biometric authentication.

The lock control block 140 continues the lock without unlocking the second door part 9*b*, even when the release condition is satisfied in a medium security area AM, which has lower security than the high security area AH, during the release phase. The position information of the medium security area AM in the medium security area AM is stored in advance in the memory 101, for example. By continuing to lock the second door part 9*b*, the lock control block 140 maintains the second door part 9*b* in the medium security area AM in a state that accepts unlocking from the outside by user operation, as shown in FIG. 18. As a result, the lock control block 140 ensures that even during the transport preparation phase, the second door part 9*b* cannot be opened in the medium security area AM without external user operation.

The above autonomous travel control system 100 controls the autonomous travel device 1 in the release phase and the transport preparation phase according to the autonomous travel control method executed according to the autonomous travel control flow shown in FIGS. 19 to 20. For the processes denoted by the same reference numerals as in the first embodiment in FIGS. 19 to 20, the description in the first embodiment is applied.

As shown in FIG. 19, in the release phase, after the release condition is satisfied in S505, this flow shifts to S506. In addition, the release condition in the present embodiment includes arrival at the medium security area AM. In S506, the determination block 110 determines whether the current area is the medium security area AM. When it is determined that the current area is not the medium security area AM, in other words, it is the high security area AH, this flow shifts to S511.

On the other hand, when it is determined in S506 that the current area is the medium security area AM, this flow shifts to S512. In S512, the lock control block 140 continues to lock the first door part 9*a* and the second door part 9*b*. Thereby, the second door part 9*b* becomes the lock state that can accept unlocking from the outside by user operation.

As shown in FIG. 20, in the transport preparation phase, this flow shifts to S216 after S215. In S216, the determination block 110 determines whether the current area is the medium security area AM. When it is determined that it is not the medium security area AM, that is, it is the high security area AH, this flow shifts to S221.

On the other hand, when it is determined in S216 that the current area is the medium security area AM, this flow shifts to S222. In S222, the lock control block 140 continues to lock the first door part 9*a* and the second door part 9*b*. As a result, the second door part 9*b* becomes loadable by unlocking from the outside through user operation.

In the subsequent S223, the determination block 110 determines whether the transport condition is satisfied. The transport condition is, for example, the same as the lock condition. When the transport condition is satisfied, this flow shifts to S235.

Fourth Embodiment

Figure 21:
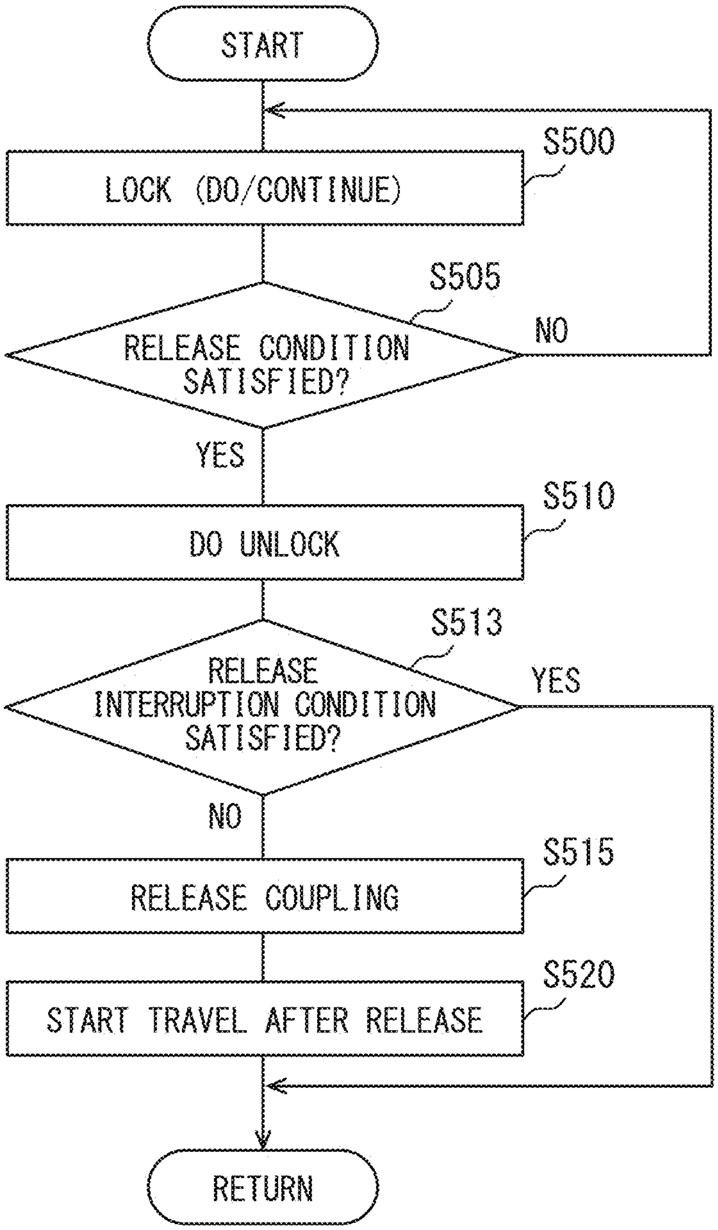
FIG. 21 is a flowchart showing an autonomous travel control flow according to a fourth embodiment.
Figure 22:
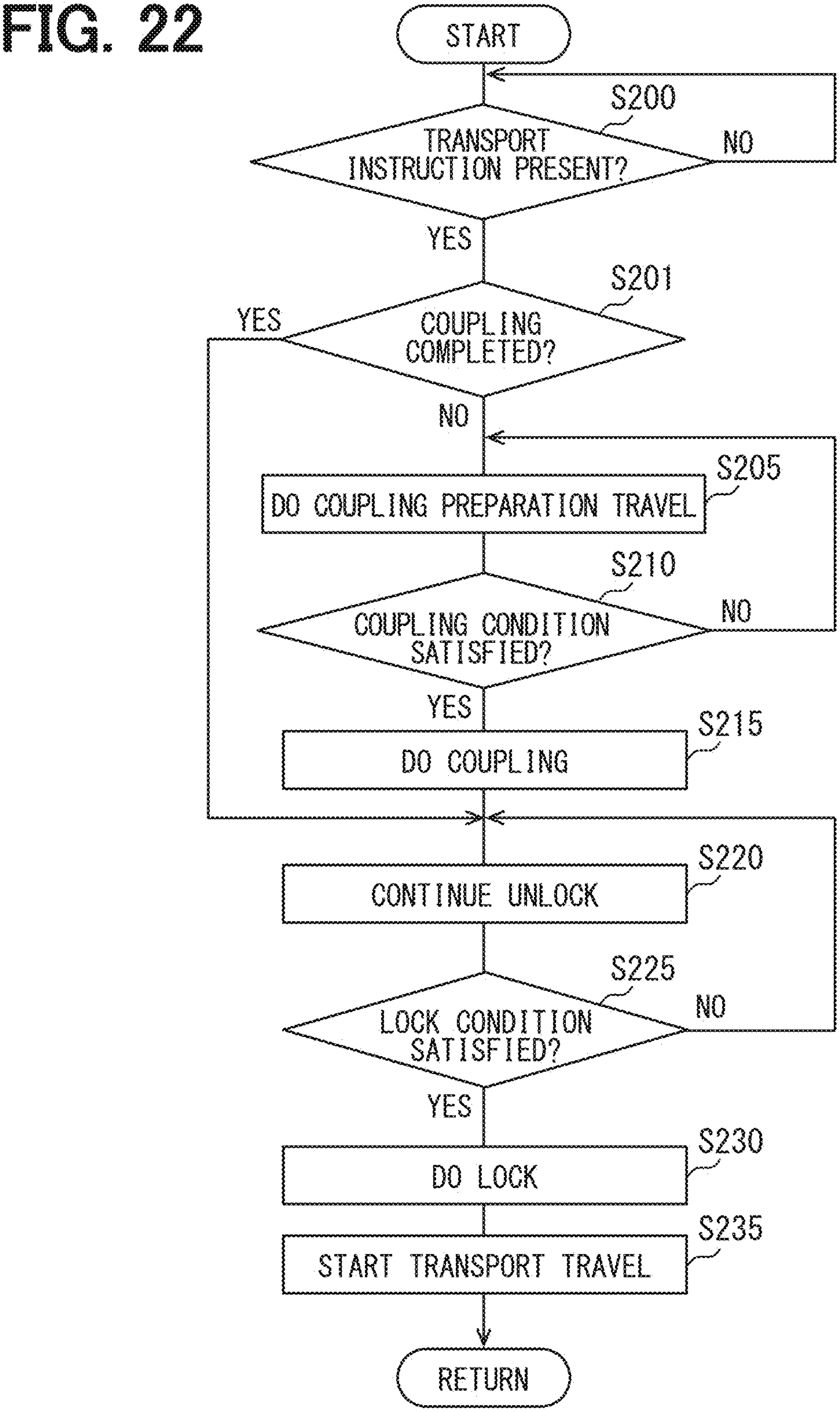
FIG. 22 is a flowchart showing an autonomous travel control flow according to the fourth embodiment.

A fourth embodiment shown in FIGS. 21 to 22 is a modification of the first embodiment.

In the release phase, the determination block 110 determines whether a release interruption condition is satisfied after the release condition is satisfied. The release interruption condition is a condition that permits the transition to the transport preparation phase without releasing the housing unit 3. The release interruption condition is satisfied, for example, when a release interruption instruction is acquired from the center C or when the transport preparation without the release has been set in advance.

The above autonomous travel control system 100 controls the autonomous travel device 1 in the release phase and the transport preparation phase according to the autonomous travel control method executed in accordance with the autonomous travel control flow shown in FIGS. 21 to 22. For the processes denoted by the same reference numerals as in the first embodiment in FIGS. 21 to 22, the description in the first embodiment is applied.

As shown in FIG. 21, in the release phase, after S510, this flow shifts to S513. In S513, the determination block 110 determines whether the release interruption condition is satisfied. When the release interruption condition is not satisfied, this flow shifts to S515. On the other hand, when it is determined that the release interruption condition is satisfied in S513, this flow skips processes in S515 and S520 and ends.

As shown in FIG. 22, in the transport preparation phase, when it is determined in S200 that there is the transport instruction, this flow shifts to S201. In S201, the determination block 110 determines whether the housing unit 3 and the travel unit 2 are already connected. When it is determined that it is not yet coupled, this flow shifts to S205. When it is determined that it is already coupled, this flow skips S205, S210, and S215 and shifts to S220.

Other Embodiments

Although multiple embodiments have been described above, the present disclosure is not construed as being limited to these embodiments, and can be applied to various embodiments and combinations within a scope that does not depart from the gist of the present disclosure.

Figure 23:
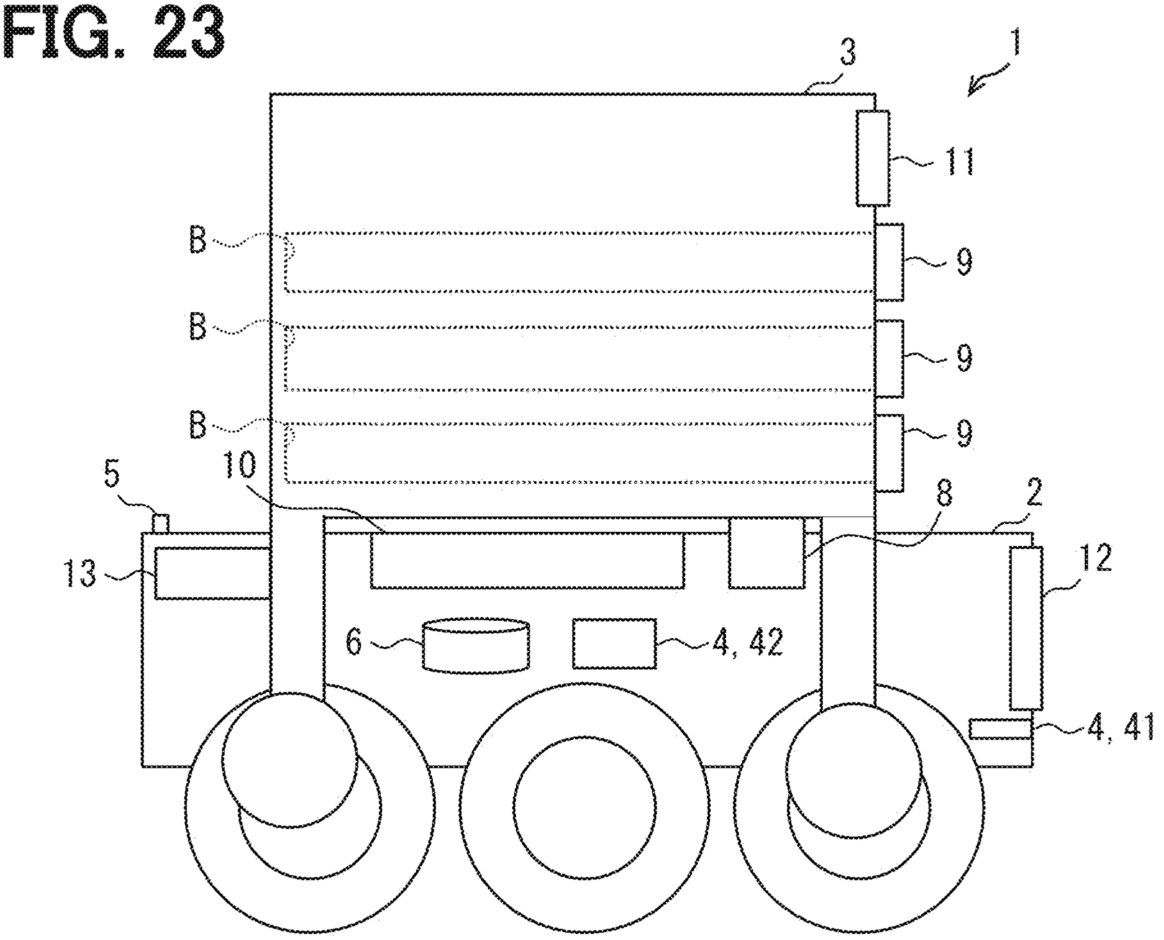
FIG. 23 is a diagram showing an autonomous travel device of a modification.

In the modification shown in FIG. 23, the verification part 11 is provided at the housing unit 3. In this case, the verification part 11 can perform verification processing by receiving power from the battery 13 of the travel unit 2 when the housing unit 3 is coupled with the travel unit 2.

In the modification, the dedicated computer constituting the autonomous travel control system 100 may include at least one of a digital circuit and an analog circuit as a processor. The digital circuit is at least one type of, for example, an application specific integrated circuit (i.e., ASIC), a field programmable gate array (i.e., FPGA), a system on a chip (i.e., SOC), a programmable gate array (i.e., PGA), a complex programmable logic device (i.e., CPLD), and the like. Such a digital circuit may also include a memory in which a program is stored.

In the modification, a host mobile object to which the autonomous travel control system 100 is applied may be, for example, an autonomous travel robot capable of transporting the transport target or collecting information through autonomous traveling or remote traveling. In addition to the above-described embodiments and modifications, the present disclosure may be implemented in forms of a control device mountable on a host mobile object and including at least one processor 102 and at least one memory 101, a processing circuit (for example, a processing ECU, etc.) or a semiconductor device (for example, semiconductor chip, etc.)

What is claimed is:

1. An autonomous travel device comprising:

a housing unit including a housing room capable of housing a transport target; and a travel unit that includes a controller including a processor and is detachably coupled to the housing unit, wherein the travel unit is configured to travel from a high security area to a delivery area where the transport target is delivered and back to the high security area, the high security area having a security higher than the delivery area, the housing unit includes a door that is configured to:

open and close the housing room;

mechanically switch a state between a locked state and an unlocked state according to an electrical control from the controller; and mechanically maintain a state prior to decoupling in a coupling release state of the travel unit and the housing unit, the controller of the travel unit is configured to:

switch, in the delivery area, the state of the door of the housing unit coupled to the travel unit to the unlocked state when a delivery condition for delivering the transport target to a transport destination user is satisfied;

determine whether a release condition is satisfied, the release condition including that the travel unit has arrived at the delivery area;

switch, in the high security area after returning from the delivery area, the state of the door of the housing unit coupled to the travel unit to the unlocked state; and release, in the high security area, coupling between the travel unit and the housing unit while maintaining the unlocked state of the door when the release condition is satisfied.

2. The autonomous travel device according to claim 1, wherein switching between the locked state and the unlocked state of the door includes the delivery condition including verifying the transport destination user permitted to remove the transport target from the housing unit.

3. The autonomous travel device according to claim 2, wherein the travel unit includes a verification part configured to verify the transport destination user, the verification part comprising a touch panel or a scanner.

4. The autonomous travel device according to claim 2, wherein the housing unit includes a verification part configured to verify the transport destination user, the verification part comprising a touch panel or a scanner, and the switching between the locked state and the unlocked state of the door includes controlling verification by the verification part in a coupling state of the travel unit and the housing unit.

5. The autonomous travel device according to claim 1, wherein the housing room of the housing unit includes a plurality of housing rooms, and the door is provided for each of the plurality of housing rooms.

6. The autonomous travel device according to claim 1, wherein the door includes a first door used for delivering the transport target to the transport destination user, and a second door that is different from the first door and opens and closes the housing room common with the first door, and switching between the locked state and the unlocked state of the door includes switching the state of the second door to the unlocked state and maintaining the locked state of the first door when the delivery condition is satisfied, and switching the state of the first door to the unlocked state and maintaining the locked state of the second door when the release condition is satisfied.

7. The autonomous travel device according to claim 1, further comprising a peripheral environment sensor mounted on at least one of the travel unit or the housing unit.

8. The autonomous travel device according to claim 7, wherein switching between the locked state and the unlocked state of the door includes prohibiting switching to the unlocked state of the door when the transport target is delivered in a case where a suspicious condition for a peripheral environment is satisfied.

9. The autonomous travel device according to claim 7, wherein switching between the locked state and the unlocked state of the door includes, after the delivery condition is satisfied and the state of door is switched to the unlocked state, further switching the state of the door to the locked state when a suspicious condition for peripheral environment is satisfied.

10. The autonomous travel device according to claim 1, further comprising a non-contact sensor that identifies the transport target in the housing room.

11. The autonomous travel device according to claim 10, wherein switching between the locked state and the unlocked state of the door includes, in a state where the transport target which is permitted to be removed for the transport destination user remains, maintaining the unlocked state when the delivery condition is satisfied.

12. The autonomous travel device according to claim 10, wherein switching between the locked state and the unlocked state of the door includes switching the unlocked state of the door to the locked state again, the unlocked state being caused the satisfied delivery condition, according to delivery of the transport target which is permitted to be removed for the transport destination user.

13. The autonomous travel device according to claim 1, wherein releasing coupling of the housing unit and the travel unit includes a release condition including arrival at a high security area with higher security than a delivery area where the transport target is delivered.

14. The autonomous travel device according to claim 1, wherein the delivery area is set within a low security area, the delivery area is an area including a location of the transport destination user or an area including a delivery location set by the transport destination user or a center, and the high security area is set at a position different from the low security area.

15. An autonomous travel control system comprising a processor configured to control an autonomous travel device including a housing unit including a housing room capable of housing a transport target and a travel unit that is detachably coupled to the housing unit, wherein the travel unit is configured to travel from a high security area to a delivery area where the transport target is delivered and back to the high security area, the high security area having a security higher than the delivery area, the housing unit includes a door that is configured to:

open and close the housing room; and mechanically switch a state between a locked state and an unlocked state according to an electrical control when a delivery condition for delivering the transport target to a transport destination user is satisfied, and the processor is configured to:

switch, in the delivery area, a state of a door of the housing unit coupled to the travel unit to an unlocked state, the door mechanically maintaining a state prior to decoupling in a state where the travel unit and the housing unit are decoupled;

determine whether a release condition is satisfied, the release condition including that the travel unit has arrived at the delivery area;

switch, in the high security area after returning from the delivery area, the state of the door of the housing unit coupled to the travel unit between the locked state and the unlocked state; and release, in the high security area, coupling between the travel unit and the housing unit while maintaining the unlocked state of the door when the release condition is satisfied.

16. An autonomous travel control device comprising a processor that: is configured to control an autonomous travel device including a housing unit including a housing room capable of housing a transport target and a travel unit that is detachably coupled to the housing unit; and is mountable on the autonomous travel device, wherein the travel unit is configured to travel from a high security area to a delivery area where the transport target is delivered and back to the high security area, the high security area having a security higher than the delivery area, the housing unit coupled to the travel unit includes a door that is configured to:

open and close the housing room; and mechanically switch a state between a locked state and an unlocked state according to an electrical control when a delivery condition for delivering the transport target to a transport destination user is satisfied, and the processor is configured to:

switch, in the delivery area, a state of a door of the housing unit coupled to the travel unit to an unlocked state, the door mechanically maintaining a state prior to decoupling in a state where the travel unit and the housing unit are decoupled;

determine whether a release condition is satisfied, the release condition including that the travel unit has arrived at the delivery area;

switch, in the high security area after returning from the delivery area, the state of the door of the housing unit coupled to the travel unit to the unlocked state; and release, in the high security area, coupling between the travel unit and the housing unit while maintaining the unlocked state of the door when the release condition is satisfied.

17. An autonomous travel control method executed by a processor for controlling an autonomous travel device including a housing unit including a housing room capable of housing a transport target and a travel unit that is detachably coupled to the housing unit, wherein the travel unit is configured to travel from a high security area to a delivery area where the transport target is delivered and back to the high security area, the high security area having a security higher than the delivery area, the housing unit includes a door that is configured to:
closes open and close the housing room; and
mechanically switch a state between a locked state and an unlocked state according to an electrical control when a delivery condition for delivering the transport target to a transport destination user is satisfied, and
the method includes:
switching, in the delivery area, a state of a door of the housing unit coupled to the travel unit to an unlocked state, the door mechanically maintaining a state prior to decoupling in a state where the travel unit and the housing unit are decoupled;
determining whether a release condition is satisfied, the release condition including that the travel unit has arrived at the delivery area;
switching, in the high security area after returning from the delivery area, the state of the door of the housing unit coupled to the travel unit to the unlocked state; and
releasing, in the high security area, coupling between the travel unit and the housing unit while maintaining the unlocked state of the door when the release condition is satisfied.

18. A non-transitory computer-readable storage medium storing an autonomous travel control program including instructions executed by a processor for controlling an autonomous travel device including a housing unit including a housing room capable of housing a transport target and a travel unit that is detachably coupled to the housing unit, wherein
the travel unit is configured to travel from a high security area to a delivery area where the transport target is delivered and back to the high security area, the high security area having a security higher than the delivery area,
the housing unit includes a door that is configured to:
open and close the housing room; and
mechanically switch a state between a locked state and an unlocked state according to an electrical control when a delivery condition for delivering the transport target to a transport destination user, and
the instructions include causing the processor to:
switch, in the delivery area, a state of a door of the housing unit coupled to the travel unit to an unlocked state, the door mechanically maintaining a state prior to decoupling in a state where the travel unit and the housing unit are decoupled;
determine whether a release condition is satisfied, the release condition including that the travel unit has arrived at the delivery area;
switch, in the high security area after returning from the delivery area, the state of the door of the housing unit coupled to the travel unit to the unlocked state; and
release, in the high security area, coupling between the travel unit and the housing unit while maintaining the unlocked state of the door when the release condition is satisfied.

* * * * *